(12) United States Patent
Mizosoe et al.

(10) Patent No.: US 10,728,362 B2
(45) Date of Patent: *Jul. 28, 2020

(54) CONTENT DELIVERY SYSTEM, DELIVERY SERVER, RECEIVING TERMINAL, AND CONTENT DELIVERY METHOD

(71) Applicant: Maxell, Ltd., Kyoto (JP)

(72) Inventors: Hiroki Mizosoe, Kawasaki (JP); Junji Shiokawa, Chigasaki (JP); Kazuto Yoneyama, Yokohama (JP); Kunihiro Nomura, Kawasaki (JP); Masaaki Hiramatsu, Hachioji (JP); Yasuhisa Mori, Hitachi (JP); Takashi Yoshimaru, Kokubunji (JP); Kazuaki Aoyama, Tokyo (JP); Tomomu Ishikawa, Tokyo (JP); Yo Miyamoto, Tokyo (JP)

(73) Assignee: Maxell, Ltd., Kyoto (JP)

( * ) Notice: Subject to any disclaimer, the term of this patent is extended or adjusted under 35 U.S.C. 154(b) by 37 days.

This patent is subject to a terminal disclaimer.

(21) Appl. No.: 16/039,666

(22) Filed: Jul. 19, 2018

(65) Prior Publication Data

US 2018/0324276 A1 Nov. 8, 2018

Related U.S. Application Data

(63) Continuation of application No. 15/465,964, filed on Mar. 22, 2017, now Pat. No. 10,057,371, which is a
(Continued)

(30) Foreign Application Priority Data

Feb. 28, 2008 (JP) .................................. 2008-048389
May 26, 2008 (JP) .................................. 2008-136185

(51) Int. Cl.
G06F 15/16 (2006.01)
H04L 29/08 (2006.01)
(Continued)

(52) U.S. Cl.
CPC ........... *H04L 67/32* (2013.01); *G06Q 10/107* (2013.01); *H04L 51/10* (2013.01);
(Continued)

(58) Field of Classification Search
USPC ................ 709/206, 219, 205, 207, 217, 218
See application file for complete search history.

(56) References Cited

U.S. PATENT DOCUMENTS 6,457,057 B1 9/2002 Kageyu
6,789,078 B2 9/2004 Saitou
(Continued)

FOREIGN PATENT DOCUMENTS

JP 2006-11626 A 1/2006
JP 2007-19669 A 8/2007
(Continued)

OTHER PUBLICATIONS

The Chinese Office Action dated Jan. 27, 2016 in the corresponding Chinese Application (Application No. 20130009137.9).
(Continued)

*Primary Examiner* — Jude Jean Gilles
(74) *Attorney, Agent, or Firm* — Mattingly & Malur, PC

(57) ABSTRACT

A transmitting terminal can transmit a content held by itself to a specific receiving terminal having no email software as if using a mailer. The transmitting terminal (10) and the receiving terminal (20) are connected to a delivery server (30) via a network (4). The delivery server (30) comprises: a database (36) for registering the device ID that specifies the receiving terminal (20); a content storage (39) for temporarily storing a content transmitted from the transmit-
(Continued)

ting terminal (10); and table (33, 37) for managing contents separately on a per device ID basis of the receiving terminal. The delivery server (30), when receiving a request from the receiving terminal (20), refers to the tables (33, 27) and transmits to the receiving terminal (20) a content, the transmission destination of which corresponds to the device ID of the receiving terminal (20).

9 Claims, 42 Drawing Sheets

Related U.S. Application Data continuation of application No. 15/055,629, filed on Feb. 28, 2016, now Pat. No. 9,661,101, which is a continuation of application No. 13/914,632, filed on Jun. 11, 2013, now Pat. No. 9,313,295, which is a continuation of application No. 12/746,881, filed as application No. PCT/JP2009/000292 on Jan. 27, 2009, now Pat. No. 8,484,299.

(51) Int. Cl.

| | | |
|---|---|---|
| *G06Q 10/10* | (2012.01) | |
| *H04N 21/2225* | (2011.01) | |
| *H04N 21/414* | (2011.01) | |
| *H04N 21/4227* | (2011.01) | |
| *H04N 21/472* | (2011.01) | |
| *H04N 21/658* | (2011.01) | |
| *H04L 12/58* | (2006.01) | |
| *H04N 21/254* | (2011.01) | |
| *H04N 21/426* | (2011.01) | |
| *H04N 21/4627* | (2011.01) | |

(52) U.S. Cl.
CPC ..... *H04L 67/2857* (2013.01); *H04N 21/2225* (2013.01); *H04N 21/2541* (2013.01); *H04N 21/41407* (2013.01); *H04N 21/4227* (2013.01); *H04N 21/42684* (2013.01); *H04N 21/4627* (2013.01); *H04N 21/47202* (2013.01); *H04N 21/6581* (2013.01)

(56) References Cited

U.S. PATENT DOCUMENTS

| | | | |
|---|---|---|---|
| 7,031,016 B1 | 4/2006 | Ohwa | |
| 7,484,175 B2* | 1/2009 | Kirkland | H04M 1/72555 715/751 |
| 8,295,819 B1 | 10/2012 | Kaplan | |
| 8,484,299 B2* | 7/2013 | Mizosoe | G06Q 10/107 709/206 |
| 8,528,029 B2 | 9/2013 | Walker | |
| 8,533,358 B2 | 9/2013 | Charlebois | |
| 8,571,570 B2 | 10/2013 | Walker | |
| 8,893,179 B2 | 11/2014 | Charlebois | |
| 9,313,295 B2* | 4/2016 | Mizosoe | G06Q 10/107 |
| 9,661,101 B2* | 5/2017 | Mizosoe | G06Q 10/107 |
| 10,057,371 B2* | 8/2018 | Mizosoe | H04N 21/2225 |
| 2002/0035516 A1 | 3/2002 | Arima | |
| 2002/0062360 A1 | 5/2002 | Ishiguro | |
| 2002/0161712 A1 | 10/2002 | Hatano | |
| 2003/0043183 A1 | 3/2003 | Sakakibara | |
| 2004/0105416 A1 | 6/2004 | Rue | |
| 2004/0162878 A1* | 8/2004 | Lewis | H04L 29/06027 709/204 |
| 2005/0078677 A1 | 4/2005 | Benting et al. | |
| 2005/0135780 A1* | 6/2005 | Park | H04N 5/772 386/220 |
| 2005/0141853 A1* | 6/2005 | Takemura | H04N 21/2662 386/329 |
| 2005/0172154 A1 | 8/2005 | Short | |
| 2005/0289117 A1 | 12/2005 | Hiraishi et al. | |
| 2006/0050141 A1 | 3/2006 | Yoshimura | |
| 2006/0064421 A1 | 3/2006 | Futagawa | |
| 2006/0256223 A1 | 11/2006 | Lee | |
| 2007/0043769 A1 | 2/2007 | Kasahara | |
| 2007/0127842 A1 | 6/2007 | Yasuda | |
| 2008/0201484 A1 | 8/2008 | Sano | |
| 2009/0171970 A1* | 7/2009 | Keefe | G06Q 10/10 |
| 2010/0268783 A1 | 10/2010 | Mizosoe | |
| 2012/0331020 A1* | 12/2012 | Morishita | G06F 16/58 707/822 |

FOREIGN PATENT DOCUMENTS

| | | |
|---|---|---|
| JP | 2008-52434 A | 3/2008 |
| JP | 2016-153340 A | 6/2017 |

OTHER PUBLICATIONS

Japanese Office Action received in corresponding Japanese Application No. 2016-153340 dated Jun. 20, 2017.

* cited by examiner

FIG.5

UNREAD E-MAIL CHECK TABLE

| DEVICE ID | COUNT OF PERSONS WAITING TO BE ACCEPTED | USER ID | UNREAD E-MAIL (1: EXISTS, 0: DOES NOT EXIST) |
|---|---|---|---|
| 1234567 | 2 | USER ID 1<br>USER ID 2 | 1<br>0 |
| 1234568 | 1 | USER ID 3 | 0 |

FIG.6

SENDER DB

| USER ID | PASS-WORD | NAME FOR DISPLAY | ADDRESS, NAME, TEL NO., BIRTH DATE | COUNT OF RECEIVERS | DEVICE ID | RECEIVER'S E-MAIL ADDRESS |
|---|---|---|---|---|---|---|
| USER ID 4 | | | | 3 | 1230001<br>3210002<br>2130003 | 1230001@aaa.co.jp<br>3210002@aaa.co.jp<br>2130003@aaa.co.jp |

| USER ID | NUMBER OF MOBILE PHONES | MOBILE PHONE'S E-MAIL ADDRESS | CREDIT CARD NUM. | EXPIRY DATE PRESCRIBED | JOIN DATE |
|---|---|---|---|---|---|
| USER ID 5 | | | | | |

FIG.7

RECEIVER DB

| DEVICE ID | NAME FOR DISPLAY | ADDRESS, NAME, TEL NO., BIRTH DATE | COUNT OF SENDERS | USER ID | RECEIVER'S E-MAIL ADDRESS |
|---|---|---|---|---|---|
| 1230002 | | | 2 | USER ID 5<br>USER ID 6 | 1230002@aaa.co.jp |

FIG. 8

CONTENT MANAGEMENT TABLE

| DEVICE ID | COUNT OF RECEIVED FILES | FILE NAME | SENDER'S USER ID | RATE PLAN | EXPIRY DATE |
|---|---|---|---|---|---|
| 0000001 | 4 | ○○○○○ | USER ID 1 | FLAT-RATE BASIC | - |
| | | △△△△△ | USER ID 1 | FLAT-RATE BASIC | - |
| | | □□□□□ | USER ID 2 | FLAT-RATE HIGH GRADE | - |
| | | ××××× | USER ID 3 | METERED-RATE | DEC., 31 |

FIG. 9

VIDEO DELIVERY SERVICE

LOGIN

E-MAIL ADRRESS

PASSWORD

LOGIN

FOR FIRST-TIME USER

USER REGISTRATION

FIG.10

VIDEO DELIVERY SERVICE

USER REGISTRATION
1. VERIFY    2. SPECIFY        3. ENTER         4. CONFIRM
   THE TERMS   A DESTINATION     MEMBER INFO      THE ENTRY

TERMS OF SERVICE
xxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxx PERSONAL INFO HANDLING CONDITIONS
xxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxx

● I AGREE   ○ I DON'T AGREE
[NEXT STEP]

FIG.11

VIDEO DELIVERY SERVICE

USER REGISTRATION
1. VERIFY    2. SPECIFY        3. ENTER         4. CONFIRM
   THE TERMS   A DESTINATION     MEMBER INFO      THE ENTRY

DESTINATION ID [           ]

[NEXT STEP]

FIG.12

```
VIDEO DELIVERY SERVICE

USER REGISTRATION
  1.VERIFY        2.SPECIFY       3.ENTER           4.CONFIRM
    THE TERMS      A DESTINATION   MEMBER INFO       THE ENTRY

DESTINATION ID:        12345333333333
NAME OF THIS DESTINATION  [        ]
NAME FOR DISPLAY        [                              ]
E-MAIL ADDRESS          [                              ]
    NAME
(KANA SUBSCRIPT)        [            ]
POST CODE               [      ]
ADDRESS                 [                              ]
TEL NO.                 [            ]
BIRTH DATE      YR [   ]   MO [   ]   DAY [   ]

[CONFIRM]
```

FIG.13

```
┌─────────────────────────────────────────────────────────────┐
│              ▓▓▓VIDEO DELIVERY SERVICE▓▓▓                   │
│                                                              │
│  USER REGISTRATION                                           │
│    1.VERIFY      2.SPECIFY       3.ENTER      ┌4.CONFIRM┐   │
│     THE TERMS     A DESTINATION   MEMBER INFO │ THE ENTRY│  │
│                                               └──────────┘  │
│                                                              │
│  NAME OF THIS DESTINATION   XXXXXXXXXXXX  (DESTINATION ID : 12345333333333) │
│  NAME FOR DISPLAY           XXXXXXXXXXXX                    │
│  E-MAIL ADDRESS             XXXXXXXXXXXXXXXX@XXXXXXXXXX.com │
│      NAME                                                    │
│  (KANA SUBSCRIPT)           XXXXXXXXXXXX                    │
│  POST CODE                  XXXXXXX                         │
│  ADDRESS                    XXXXXXXXXXXX X XXXXXXXXXXXX X XXXXXXXXXXXX │
│  TEL NO.                    XXXXXXXXXXXX X                  │
│  BIRTH DATE                 YR XXXX  MO XX  DAY XX          │
│                                                              │
│              ┌─────────┐  ┌──────────────────────────────┐  │
│              │TRANSMIT │  │RETURN TO "ENTER MEMBER INFO" │  │
│              └─────────┘  └──────────────────────────────┘  │
└─────────────────────────────────────────────────────────────┘
```

FIG.14

VIDEO DELIVERY SERVICE

USER REGISTRATION (TENTATIVE REGISTRATION COMPLETED)
SYSTEM TENTATIVELY REGISTERED YOU NAMED ○○○○ AS A MEMBER OF
VIDEO DELIVERY SERVICE.
YOU ARE NOW IN TENTATIVE REGISTRATION STATUS.
YOU CAN USE THE SERVICE AFTER THE FOLLOWING PROCEDURE.

1. PLEASE LET THE DESTINATION ID: XXXXXXXXXXXXXXXX (RECEIVER NAMED ○○)
   ACCEPT YOU AS THE SENDER.
2. AFTER THE ACCEPTANCE, THE SYSTEM SENDS E-MAIL TO YOU NAMED ○○○○.
   ..........................................
   ..............................

RETURN TO TOP PAGE

FIG.15

NEWLY ARRIVING E-MAIL: 1

| YR 0000 (HEISEI 00) MO 00 | «PREVIOUS MO | CURRENT MO | NEXT MO» | 1 VOD | 11 | 12 |
| | | | | 4 VIDEO DELIVERY | 5 FAMILY CALENDER | 6 HEALTH CLUB |
| | | | | 7 INTRODUCING ELECTRIC GOODS | 8 SHOPPING | 9 MEMO MESSAGING |
| | | | | 10 MENU | 11 SETTING | 12 |

OPERATING GUIDANCE

FIG.17

VIDEO DELIVERY SERVICE

DEFINITE REGISTRATION
 YOU CAN MAKE A DEFINITE REGISTRATION FROM THIS PAGE.
 ONCE THIS DEFINITE REGISTRATION HAS BEEN MADE, SERVICE CHARGE IS IMPOSED.

| 1.ENTER INFO FOR DEFINITE REGISTRATION |  2.CONFIRM THE ENTRY

PASSWORD
IF YOU FORGOT YOUR PASSWORD, USE THE QUERY.
QUERY/ANSWER

CHOOSE A COURSE AS YOU LIKE.
 ● [FLAT-RATE BASIC COURSE] 300YEN/MO, CAPACITY OF 3 GB···
 ○ [FLAT-RATE HIGH GRADE COURSE] 500YEN/MO, CAPACITY OF 6 GB···
 ○ [METERED-RATE COURSE] 100YEN FOR STILL PICTURES AND 300YENS
                          FOR MOTION PICTURES PER E-MAIL,···

CREDIT CARD NOMINEE
CREDIT CARD NO.
EXPIRY DATE            MO/        YR
SECURITY CODE

CONFIRM

| | DESTINATION ID | NAME OF DESTINATION | | | |
|---|---|---|---|---|---|
| 1 | 1234500001 | FAMILY HOME OF ○○○○ | CHANGE | DELETE | ADDRESS CHANGE |
| 2 | 1234500123 | ○○○○ OF ○○○○ | CHANGE | DELETE | ADDRESS CHANGE |
| 3 | 1234501536 | ○○○○ OF ○○○○ | CHANGE | DELETE | RECEPTION STOP / ACCEPTANCE REQUEST |
| 4 | | | | | |
| 5 | | | | | |

VIDEO DELIVERY SERVICE

ADD/EDIT DESTINATIONS

CONFIRM    CANCEL

FIG.21

| | VIDEO DELIVERY SERVICE | | | |
|---|---|---|---|---|
| | REGISTER/EDIT MOBILE PHONES | | | |
| | MOBILE PHONE'S E-MAIL ADDRESS | NAME | | |
| 1 | XXXXXXXX@XXXXX.ne.jp | SERVICE REGISTRANT | CHANGE | DELETE |
| 2 | XXXXXXXX@XXXXX.ne.jp | OOOOOOOO | CHANGE | DELETE |
| 3 | XXXXXXXX@XXXXX.ne.jp | OOOOOOOO | CHANGE | DELETE |
| ... | ........ | ........ | | |
| 9 | XXXXXXXX@XXXXX.ne.jp | OOOOOOOO | CHANGE | DELETE |
| 10 | | | | |

TRANSMIT

FIG.32

```
VIDEO DELIVERY SERVICE
  ACCEPTING SENDER
              TARO WANTS TO
              TRANSMIT E-MAIL TO YOU.
                ┌─────────────────────────┐
                │ ○  I ACCEPT DELIVERY OF │
                │    VIDEO FROM THIS PERSON. │
                └─────────────────────────┘
                ┌─────────────────────────┐
                │ ✕  I DON'T ACCEPT VIDEO │
                │    FROM THIS PERSON.    │
                └─────────────────────────┘

┌─────────────────────────┐
                │ ABORT (TO THE SENDER LIST) │
                └─────────────────────────┘
  OPERATING GUIDANCE
```

FIG.33

```
VIDEO DELIVERY SERVICE
  STOPPING RECEPTION/RESUMING RECEPTION
           SYSTEM CHANGES THE MODE OF
           RECEIVING E-MAIL FROM GORO.
           THE MODE IN WHICH "YOU RECEIVE E-MAIL
           FROM THAT PERSON" IS SET ON NOW.
                ┌─────────────────────────┐
                │ ○  I RECEIVE VIDEO.     │
                └─────────────────────────┘
                ┌─────────────────────────┐
                │ ✕  I DON'T RECEIVE VIDEO. │
                └─────────────────────────┘

┌─────────────────────────┐
                │ ABORT (TO THE SENDER LIST) │
                └─────────────────────────┘
  OPERATING GUIDANCE
```

AUTHENTIFICATION SERVER 70

TV DEVICE DB

| DEVICE ID | SERVICE ID |
|---|---|
| 1234567 | SERVICE ID 1<br>SERVICE ID 2 |
| 1234568 | SERVICE ID 1 |

FIG.37

ONE-TIME ID MANAGEMENT TABLE

| DEVICE ID | SERVICE ID | ONE-TIME ID |
|---|---|---|
| 1234567 | SERVICE ID 1 | ONE-TIME ID 11 |
| 1234568 | SERVICE ID 1 | ONE-TIME ID 21 |

FIG.39

TV DEVICE DB
(FOR MANAGEMENT USING DEVICE IDENTIFYING ID)

| DEVICE IDENTIFYING ID | DEVICE ID | SERVICE ID |
|---|---|---|
| 3246547 | 1234567 | SERVICE ID 1<br>SERVICE ID 2 |
| 7626549 | 1234568 | SERVICE ID 1 |

FIG.40

ONE-TIME ID MANAGEMENT TABLE
(FOR MANAGEMENT USING DEVICE IDENTIFYING ID)

| DEVICE IDENTIFYING ID | SERVICE ID | ONE-TIME ID |
|---|---|---|
| 3246547 | SERVICE ID 1 | ONE-TIME ID 11 |
| 7626549 | SERVICE ID 1 | ONE-TIME ID 21 |

UNREAD E-MAIL CHECK TABLE
(FOR MANAGEMENT USING DEVICE IDENTIFYING ID)

| DEVICE IDENTIFYING ID | COUNT OF PERSONS WAITING TO BE ACCEPTED | USER ID | UNREAD E-MAIL (1: EXISTS, 0: DOES NOT EXIST) |
|---|---|---|---|
| 1234567 | 2 | USER ID 1<br>USER ID 2 | 1<br>0 |
| 1234568 | 1 | USER ID 3 | 0 |

FIG.46

SENDER DB (FOR MANAGEMENT USING DEVICE IDENTIFYING ID)

| USER ID | PASS-WORD | NAME FOR DISPLAY | ADDRESS, NAME, TEL NO., BIRTH DATE | COUNT OF RECEIVERS | DEVICE IDENTIFYING ID | RECEIVER'S E-MAIL ADDRESS |
|---|---|---|---|---|---|---|
| USER ID 4 | | | | 3 | 1230001<br>3210002<br>2130003 | 1230001@aaa.co.jp<br>3210002@aaa.co.jp<br>2130003@aaa.co.jp |

| USER ID | NUMBER OF MOBILE PHONES | MOBILE PHONE'S E-MAIL ADDRESS | CREDIT CARD NUM. | EXPIRY DATE PRESCRIBED | JOIN DATE |
|---|---|---|---|---|---|
| USER ID 5 | | | | | |

FIG.47

RECEIVER DB (FOR MANAGEMENT USING DEVICE IDENTIFYING ID)

| DEVICE IDENTIFYING ID | NAME FOR DISPLAY | ADDRESS, NAME, TEL NO., BIRTH DATE | COUNT OF SENDERS | USER ID | RECEIVER'S E-MAIL ADDRESS |
|---|---|---|---|---|---|
| 1230002 | | | 2 | USER ID 5<br>USER ID 6 | 1230002@aaa.co.jp |

FIG.48

CONTENT MANAGEMENT TABLE
(FOR MANAGEMENT USING DEVICE IDENTIFYING ID)

| DEVICE IDENTIFYING ID | COUNT OF RECEIVED FILES | FILE NAME | SENDER'S USER ID | RATE PLAN | EXPIRY DATE |
|---|---|---|---|---|---|
| 0000001 | 4 | ○○○○○○ | USER ID 1 | FLAT-RATE BASIC | - |
| | | △△△△△△ | USER ID 1 | FLAT-RATE BASIC | - |
| | | □□□□□□ | USER ID 2 | FLAT-RATE HIGH GRADE | - |
| | | ×××××× | USER ID 3 | METERED-RATE | DEC., 31 |

FIG.50

MEMBER DB

| PRIMARY MEMBER ID | PASS-WORD | NAME FOR DISPLAY | ADDRESS, NAME, TEL NO., BIRTH DATE | NUMBER OF DEVICES OWNED BY THE MEMBER | DEVICE IDENTIFYING ID | TO BE CONTINUED |
|---|---|---|---|---|---|---|
| USER ID 4 | | | | 3 | 1230001<br>3210002<br>2130003 | |

| CONTINU-ATION | COUNT OF E-MAIL ACCOUNTS | E-MAIL ADDRESS | CREDIT CARD NUM. | EXPIRY DATE PRESCRIBED | JOIN DATE |
|---|---|---|---|---|---|
| | 6 | 1230001@aaa.co.jp<br>3210002@aaa.co.jp<br>2130003@aaa.co.jp<br>1230001_PRIMARY-MEMBER-ID-1@aaa.co.jp<br>1230001_CHILD-MEMBER-ID-1@aaa.co.jp<br>1230001_CHILD-MEMBER-ID-2@aaa.co.jp | | | |

FIG.51

TV DEVICE DB (FOR MANAGEMENT FURTHER USING MEMBER ID)

| DEVICE IDENTIFYING ID | DEVICE ID | PRIMARY MEMBER ID | CHILD MEMBER ID | PASS-WORD | SERVICE ID |
|---|---|---|---|---|---|
| 1230001 | 1234567 | PRIMARY MEMBER ID 1 | CHILD MEMBER ID 1<br>CHILD MEMBER ID 2 | | SERVICE ID 1<br>SERVICE ID 2 |
| 7626549 | 1234568 | PRIMARY MEMBER ID 2 | CHILD MEMBER ID 3<br>CHILD MEMBER ID 4 | | SERVICE ID 1 |

FIG.52

ONE-TIME ID MANAGEMENT TABLE
(FOR MANAGEMENT FURTHER USING MEMBER ID)

| DEVICE IDENTIFYING ID | SERVICE ID | ONE-TIME ID |
|---|---|---|
| 3246547 | SERVICE ID 1 | ONE-TIME ID 11 |
| 7626549 | SERVICE ID 1 | ONE-TIME ID 21 |

FIG.54

| MEMBER ID | |
|---|---|
| TOP PAGE | PRIMARY MEMBER ID: ****     NAME: PAPASAN |
| REGISTER AND CONFIRM | CHILD MEMBER ID: ****     NAME: MAMASAN |
| | CHILD MEMBER ID: NOT REGISTERED |
| DEREGISTER | NEW REGISTRATION INFORMATION INPUT |

MEMBER REGISTRATION IS RECOMMENDED TO USE SERVICES CONVENIENTLY.
TO USE VIDEO DELIVERY SERVICE, THE COSTUMER HAS TO TELL E-MAIL SENDERS THE DEVICE IDENTIFYING ID AS WELL AS MEMBER IDS.

FIG.55

| MEMBER ID | | |
|---|---|---|
| TOP PAGE | PRIMARY MEMBER ID: **** | |
| REGISTER AND CONFIRM | NAME: | NAME FOR DISPLAY: |
| | PASSWORD: | |
| DEREGISTER | | |

MOVE THE CURSOR TO AND FILL A NECESSARY ITEM.
※ NAME IS MANDATORY.
AFTER COMPLETING ENTRY, CHOOSE THE REGISTER BUTTON BELOW.

[REGISTER]

FIG.56

| MEMBER ID | |
|---|---|
| TOP PAGE | PRIMARY MEMBER ID: ****  NAME: PAPASAN |
| REGISTER AND CONFIRM | CHILD MEMBER ID: ****  NAME: MAMASAN |
| | CHILD MEMBER ID: ****  NAME: TOMOKUN |
| DEREGISTER | CHILD MEMBER ID: ****  NAME: HIROKUN |

CHOOSE MEMBER ID THAT YOU WANT TO DEREGISTER
CHOOSE THE DEREGISTER BUTTON BELOW.

[DEREGISTER]

FIG.57

VIDEO DELIVERY SERVICE

USER REGISTRATION
1. VERIFY THE TERMS    2. SPECIFY A DESTINATION    3. ENTER MEMBER INFO    4. CONFIRM THE ENTRY

DESTINATION ID [        ]
MEMBER ID [        ]

[NEXT STEP]

FIG.59

MEMO MESSAGING SERVICE

ENTER A MESSAGE AND A DESTINATION AND TRANSMIT IT.

DESTINATION ID

MEMBER ID

MESSAGE

TRANSMIT

FIG.60

MEMO MESSAGING SERVICE (CONFIRMING TRANSMISSION)

WOULD YOU LIKE TO TRANSMIT THE MESSAGE BELOW?

DESTINATION ID  1230001

MEMBER ID  1234

MESSAGE  NEW DRAMA STARTS FROM * TODAY.

[EXECUTE TRANSMISSION]

FIG.61

TV DEVICE DB (FOR SUPPORT OF MEMO MESSAGING SERVICE)

| DEVICE IDENTIFYING ID | DEVICE ID | PRIMARY MEMBER ID | CHILD MEMBER ID | PASSWORD | SERVICE ID | MESSAGE | SENDER INFO |
|---|---|---|---|---|---|---|---|
| 1230001 | 1234567 | PRIMARY MEMBER ID 1 | CHILD MEMBER ID 1 CHILD MEMBER ID 2 | | SERVICE ID 1 SERVICE ID 2 | TEXT | ADDRESS OR THE LIKE |
| 7626549 | 1234568 | PRIMARY MEMBER ID 2 | CHILD MEMBER ID 3 CHILD MEMBER ID 4 | | SERVICE ID 1 | | |

CONTENT DELIVERY SYSTEM, DELIVERY SERVER, RECEIVING TERMINAL, AND CONTENT DELIVERY METHOD

This application is a continuation application of U.S. patent application Ser. No. 15/465,964, filed Mar. 22, 2017, which is a continuation application of U.S. patent application Ser. No. 15/055,629, filed Feb. 28, 2016, now U.S. Pat. No. 9,661,101, which is a continuation application of U.S. patent application Ser. No. 13/914,632, filed on Jun. 11, 2013, now U.S. Pat. No. 9,313,295, which is a continuation application of U.S. patent application Ser. No. 12/746,881, filed on Jun. 8, 2010, now U.S. Pat. No. 8,484,299, which is the US national phase of International Application No. PCT/JP2009/000292 filed on Jan. 27, 2009, which claims the benefit of priority to Japanese Patent Application No. 2008-048389, filed Feb. 28, 2008 and Japanese Patent Application No. 2008-136185, filed May 26, 2008, the content of which are hereby incorporated by reference in its entirety for all purposes.

TECHNICAL FIELD

This disclosure relates to a content delivery system for delivering content such as pictures to a particular receiving terminal via a network, a delivery server used in this system, and a technique for authenticating a user device when receiving content from the delivery server.

BACKGROUND ART

Electronic mail (hereinafter e-mail) is generally used to transmit information to only a particular person. In this case, of course, both a transmitting device and a receiving device need to have e-mail software. Lately, most of PC (personal computer) purchasers make use of e-mail, so e-mail software is usually installed in a PC sold.

Meanwhile, TV products capable of connecting to a network have lately gone on sale. However, TVs may not be connected to networks as often as PCs. E-mailing with a TV set that a family often view together would be utilized less frequent than PCs. Thus, installing e-mail software in a TV set is impractical in terms of development cost in spite of having the capability of connecting to network.

It is possible that a TV set connected to a network accesses a server and requests a content delivery from the server, even though having no e-mail software. Patent Document 1 discloses a method for scheduling a download. This document states that this method measures the rate of downloading a test file, predicts time utile completion, sets a date and time to start a download so as to complete it at a user-desired time, and schedules the download, gaining agreement with the user. If the user does not agree, an alternative data and time to start a download is presented. Another method is also described in which download status is monitored and switching to another server takes place if the download is not likely to complete until a guaranteed end time. In Patent Document 2, a method is described in which a time zone in which a download is scheduled is divided and assigned to terminals, thus distributing loads.

Further, services like above-mentioned e-mail on TV are expected to increase in future. To accommodate this, a method for authentication signaling between a service receiving device and a service delivery server is described in Patent Document 3.

Patent Document 1: Japanese Laid-Open Patent Application No. 2003-67280
Patent Document 2: Japanese Laid-Open Patent Application No. 2004-185114
Patent Document 3: Japanese Laid-Open Patent Application No. 2001-350724

DISCLOSURE OF INVENTION

Problems to be Solved by the Invention

According to the above-mentioned patent documents 1 and 2, it is possible that a terminal (TV set) having no e-mail software accesses a delivery server and downloads desired content at a desired date/time. However, both of these prior arts assume the situation access is made from a terminal (TV set) to the server, but do not consider a scenario in which the terminal receives content that belongs to a particular person or a sender transmits content that the sender owns to a particular terminal (TV set). Thus, a technique is required to allow transmission of content owned by a sender to a particular terminal (TV set) without e-mail software installed therein.

According to the above-mentioned patent document 3, authentication is performed using a device specific ID and authentication can be performed when the above-mentioned service is provided. However, no consideration is taken for more secure authentication that is effected even for a variety of services assumed to be added. Thus, a more user-friendly authentication technique is called for.

An object of the present invention is to make it possible to adapt to the addition of a diversity of service including, inter alia, a service in which a transmitting terminal can transmit content that belongs to its user (owner) to a certain receiving terminal having no e-mail software in an easy-to-use manner like via e-mail and to provide these services protected by secure authentication that is accomplished without bothering users.

Means for Solving the Problems

There is provided a content delivery system comprising a transmitting terminal, a receiving terminal, and a delivery server which are connected via a network and configured to transmit content from the transmitting terminal to the receiving terminal via the delivery server, the delivery server comprising a database for registering device IDs, each identifying each receiving terminal, a content storage for temporarily storing contents transmitted from transmitting terminals, and a table for sorting and managing contents by receiver terminal's device ID and by sender. In response to a request from a receiving terminal, the delivery server refers to the table and transmits content destined to the receiving terminal's device ID to the receiving terminal.

Advantageous Effects of the Invention

A sender can transmit content to a receiving terminal without e-mail software in an easy-to-use manner like via e-mail. Because a receiver can receive content after verifying the sender, the receiver does not have to receive transmissions of unwanted contents from the general public.

The above-discussed service and the like can be made use of securely and a service server typified by a delivery server is independent of an authentication server. It is thus possible to implement an authentication server that endures the addition of a diversity of services.

BEST MODE FOR CARRYING OUT THE INVENTION

In the following description of embodiments, a transmitting terminal is assumed to be a PC or a mobile phone and a receiving terminal a TV set. Content covers motion pictures captured by, for example, a video camera, and still pictures captured by a digital camera. These motion and still pictures are together referred to as pictures. Since a TV set has no e-mail address, an individual TV has a device ID identifying it, stored on its internal memory during its manufacturing process, and the user can know the device ID by retrieving it from the memory via a remote controller or the like of the TV set. A sender transmits pictures attached with the device ID of the originating TV set as a key. To control transmission and reception of pictures, a server is installed in a center and connected to a network. Every PC registers with the server as a member that is a sender. At this time, the sender also registers on the server the device ID of a TV set of the other party to which the sender wants to transmit pictures.

When a TV set accesses the server via the network, a confirming message as to whether to accept a registered sender is displayed on the screen of the TV set. If the receiver accepts the sender, the sender' registration becomes valid and the server initiates a service of preserving pictures received from the sender. After preserving pictures, the server sends a picture arrival message that is displayed on the registered receiver's TV screen. When the receiver selects a desired picture, the receiver can receive and view it from the server.

First Embodiment

FIG. 1 illustrates an example of overall architecture of a content delivery system according to a first embodiment. This system is configured such that a transmitting terminal (PC 10), a receiving terminal (TV set 20), and a delivery server (server 30) which relays a content delivery between both terminals are connected to a network 4 such as Internet. In this system, from the PC 10 having e-mail software, picture content belonging to the sender is transmitted to a TV set 20 having no e-mail software via the server 30.

The sender residing in the sender's home 1 copies picture content (hereinafter, also referred to as a picture file or video) captured by a video camera 11 or digital camera 12 to the PC 10. The PC 10 connects to the network 4 via routers (not shown) and transfers the picture to and has it preserved on the server 30 situated in the center 3. The server 30 preserves the picture transferred from the sender (PC 10) and waits for access from the TV set 20 in the receiver's home 2 of a receiver specified by the sender. When the TV set 20 has connected to the server 30 situated in the center 3 via the routers and the network 4, the server 30 sends the TV set 20 a message indicating the arrival of the picture and the message is displayed on the screen of the TV set 20. After that, the receiver can select, receive, and view the picture. If the TV set 20 has a self-contained storage (e.g., a hard disk), the picture can also be downloaded.

The server 30 needs to have a function of identifying the TV set 20 which is the receiving terminal. It is therefore efficient that the center 3 carrying out such a content delivery service using the server 30 is set up and operated by the same entity as the manufacture of the TV set 20. To identify the TV set 20 which is the receiving terminal, the device ID of each TV set 20 is used as an address. Besides picture transmission from the PC 10 in the sender's home, the sender can transmit a picture file captured by a mobile phone 50 which has been registered beforehand with the server from the mobile phone 50 to the server 30 via the network 4, which will be described in a second embodiment. Hereinafter, the content delivery service carried out by the center 3 (server 30) will be referred to as a "video delivery service".

Next, the server 30 and the TV set 20 are described in detail regarding their internal structures.

FIG. 2 is a diagram showing an exemplary internal structure of the server 30.

A network transceiver 31 is connected to an external network 4 and performs communication with a PC 10 and a TV set 20 via the network.

A member information manager 32 has data bases and tables, i.e., an unread e-mail check table 33, a sender DB 34, a receiver DB 35, a TV device DB 36, and a content management table 37 to store information for senders and receivers and preserved contents information. When the server is accessed from a PC 10 or TV set 20, the member information manager 32 performs processing for member information verification, registration, or others, referring to a related database or table.

For example, if the server receives data for a tentative member registration from the PC 10 of a sender, the manager 32 registers information for device ID, user ID, etc. into the unread e-mail check table 33. If the server receives a response as to whether the receiver accepts the sender from the TV set 20, the manager 32 updates the contents of the sender DB 34 and the receiver DB 35 according to the response. If the server is accessed from a TV set 20, the manager 32 requests the TV set 20 to send its device ID and acquires it. The manager 32 compares the acquired device ID with information stored in the TV device DB 36 and verifies whether the device ID is valid. In case the device ID is invalid, the manager 32 detects the invalidity at this point of time and rejects subsequent processing for the TV set. The content management table 37 is used to manage preserved contents transferred from users and hold service agreements made with each user.

A content transceiver 38 receives picture content from the PC 10 and transmits picture content to the TV set 20. A content storage 39 stores picture contents received and to be transmitted. Specifically, the content transceiver 38 stores picture content uploaded from the PC 10 into the content storage 39 and, in response to a request from the TV set 20 for a picture to receive and view or a request to download a picture, reads the picture content from the content storage 39 and transmits it to the TV set 20.

FIG. 3 is a diagram showing an exemplary internal structure of the TV set 20.

A network transceiver 21 is connected to an external network 4 and performs communication with the server 30 via the network. A browser 22 renders screen information such as an e-mail screen and an acceptance screen and outputs it to a display 27 according to information described in a form of HTML, BML, etc. transmitted from the server 30. A picture reproducer 23 decodes a still or motion picture file contained in picture content transmitted from the server 30, reproduces the still or motion picture, and outputs it to the display 27.

A device ID sender 24 reads device ID information assigned to the TV set 20 from a device ID storage 25 and sends it to the server 30 in response to a request from the server 30. In the device ID storage 25, the device ID information specific to the TV set 20 is stored and retained. This device ID information is assigned to each terminal and written into the device ID storage 25 during the manufacturing of the TV set 20. When the user wants to know the device ID, the user can retrieve it and display on the display 27, e.g., by operating an attached remote controller.

A content storage 26 is, for example, a hard disk storage device and picture content received from the server 30 is downloaded and stored into it. The user can read a picture stored and view it via the picture reproducer 23 at any time the user wants to do.

The storage 26 may be either self-contained or external. The display 27 displays pictures and/or information output from the browser 22, picture reproducer 23, and device ID sender 24 on the screen.

FIG. 4 is a flowchart illustrating a process flow of the content delivery service (video delivery service) of the first embodiment. First, the process is outlined in order of steps.

Step S101: A sender acquires the device ID of a receiving terminal (TV set 20) of the other party and the URL of the server 30 to which the TV set 20 is connected. Reversely, the receiver may tell the sender of pictures the device ID of the TV set 20 and the URL of the server 39 by telephone or fax. For this purpose, the device ID to identify the TV device is stored in the device ID storage 25 of the TV set 20. This device ID is used as an address for picture transmission. The device ID is readily retrievable so that the TV owner can easily know the device ID like a B-CAS card number using the remote controller or the like.

Step S102: The sender accesses the server 30 from the PC 10 and inputs information for the sender and receiver according to the above information (the device ID of the TV set 20 and the URL of the server 30). This is referred to as a tentative member registration. In particular, as sender information, the e-mail address of the sender as user ID, sender's address, name, name for display, birth date, telephone number, etc. are registered. As receiver information, the device ID of the TV set 20 and the receiver's name for display are registered. These items of information are tentatively registered on the database of the server 30.

Step S103: The server 30 in the center 3 notifies the receiver's TV set 20 that the tentative member registration has been made, using the device ID. In response to this, the receiver verifies and accepts the contents of the tentative registration. To do this, because the TV set 20 has no e-mail software installed, notification is accomplished as follows. In the unread e-mail check table 33 on the server 30, device IDs for which tentative registration has been made are flagged. When accessed from a TV set 20, the server 30 refers to this table and checks whether the device ID of the accessing TV set is flagged. If the device ID is flagged, the server retrieves the user ID and name of the sender from the sender database 34 and sends the TV set 20 a message "Person named OO is trying to send a picture file to you" to be displayed on the TV set 20. The receiver accepts the sending if the displayed sender (person named OO) is a favorable one.

Step S104: When the receiver accepts the sender displayed on the TV set 20, the server 30 changes the tentatively registered member information to a definite registration. It also notifies the sender by e-mail about a result as to whether the receiver has accepted the sender. The server may use the e-mail address previously registered at the tentative member registration. Upon the definite registration, the server 30 initiates the service of preserving pictures transferred from the registered sender. In other words, it is impossible for the sender to transfer pictures to and have them preserved on the server 30 until the receiver has accepted the sender. Thus, the server 30 can avoid doing an unnecessary preservation service.

Step S105: By operating the PC 10, the sender specifies the receiver who accepted the sending and transmits (uploads) a picture captured by the video camera 11 or digital camera 12. The server 30 stores the picture transmitted from the PC 10 into the content storage 39. Then, the server 30 preserves the picture until receiving a request from the specified receiver to receive it.

Step S106: The server 30 converts the format (file format) of the picture preserved into a format enabling the picture to be displayed on the TV set 20, as necessary. For example, in the case of motion pictures, a file format thereof stored on the PC 10 may not be reproduced as is on the TV set 20, though can be reproduced on PC. By picture format conversion performed in the server 30, the load on the TV set 20 can be alleviated.

Step S107: When a receiver accesses the server 30 from its TV set 20, the server 30 looks through the unread e-mail check table 33. If an unread e-mail flag is set for the device ID of the accessing TV set 20, it means that the receiver has not yet received the e-mail (picture content). In that case, the server 30 notifies the TV set 20 that pictures addressed to it arrived at the server. The receiver selects a desired picture, receives it from the server 30, and views it on the TV set 20.

Step S108: If the TV set 10 has a self-contained storage 26 such as a hard disk, it is possible to store (download) the received picture. It is also possible to erase some (if unwanted) of previously stored pictures by operating the TV set 20. With regard to erasing pictures, the sender is also able to erase the picture as preserved on the server 30 by operating the PC 10. That is, at least either of the sender and the receiver has a right to erase pictures for transmission and reception.

Step S109: If the sender has more pictures to be transmitted, the sender transmits a next picture to the server 30, returning to step S105. That is, member registration in steps S101 to S104 is completed only once at the first time. These steps are skipped at a second time and subsequent and picture transmission can take place anytime between the registered sender and receiver.

The content delivery service implemented by this system provides the following advantages:

(a) It is difficult to install additional software like e-mail software in TV sets, a home appliance product, that serve as a receiving terminal. Reasons for this are: the cost for developing such software and testing its operation is high; and upgrade is hard to do including verifying compatibility with former products. In this respect, this system enables transmission and reception of picture content without installing e-mail software in the TV set.

(b) A wide range of users including elders may have a lot of chances of operating TV sets, a home appliance product, unlike PCs. Input means for using a remote controller are also limited. It is therefore required that anyone can operate TV sets easily and readily and without erroneous operation for using the present system and service. In this regard, the present system dispenses with the input of a personal ID to identify his or her own account, instead, by using a unique device ID assigned to each device for identifying a TV set, which allows for preventing erroneous operation.

(c) After the receiver verifies and accepts the sender, the server is configured to preserve contents transferred from the sender and transmit the contents to the receiver. Accordingly, the receiver does not have to receive transmissions of unwanted contents like spam e-mails from the general public. Moreover, the delivery service can avoid unnecessary preservation of contents In the following, each of the steps of the content deliver service in FIG. 4 will be explained in greater detail.

(1) Telling the Sender the Receiver's Device ID and Server's URL (Step S101)

The vendor providing the "video delivery service", which may be, for example, a TV manufacturer, should state the address (URL) of the server 30 that carries out this service in a home page to be viewed in the cooperate website, a brochure of the TV set, a leaflet enclosed with the TV set, etc. This device ID is used as an address for picture transmission. The device ID of the TV set is stored in the device ID storage 25 and is readily retrievable so that the user can easily know the device ID like a B-CAS card number by operating the remote controller.

This device ID is used like an e-mail address. Preferably, some elaborate protection is taken to avoid transmission of the device ID to a third party, even if the sender inputs it incorrectly. For this purpose, it is preferable to present a converted device ID processed to prevent an incorrect input to the user, instead of presenting the device ID itself. For example, if an original device ID is 32 bits long, it is divided into four parts of 8 bits and a check sum is calculated by adding the bits of the respective four parts. Last 8 bits of the check sum is taken and linked to the original device ID to generate a converted device ID having a total of 40 bits. This converted device ID is presented to the user.

The converted device ID thus generated has a very low possibility of matching with the converted device ID of a third party including even the check sum, even if the sender has input a partially incorrect ID. Also, when the server are collating the check sums, there is a high possibility of a mismatch being found. Thus, there is little possibility of erroneous transmission of a device ID to the TV set of the third part and safety can be enhanced.

In a case that the above conversion processing is implemented, in the TV set 20, the conversion processing can be performed when the device ID sender 24 in FIG. 3 has read the device ID, as previously described. At the server 30 side, after acquiring the device ID from the TV set 20, the member information manager 32 in FIG. 2 performs a reverse conversion of the ID to its conversion performed in the TV set 20. Thereby, it is possible to restore the converted ID to the device ID before being converted, held in the device ID storage 25 of the TV set 20.

In the following description, especially, in first, second, and third embodiments, the device ID refers to either the original device ID or the above converted device ID.

The TV set owner tells the other party (his or her family, friends, relatives, etc.) from whom he or she wants a video transmission the device ID of his or her TV set and the URL of the portal (server) of the service provider by telephone or fax and requests the other party to make a member registration for the "video delivery service".

(2) Tentative Member Registration (Step S102)

The sender executes a member registration (tentative) for the "video delivery service", using the device ID and the server's URL acquired from the receiver. The PC 10 of the sender is equipped with the browser 22 and the following operations are performed by the browser. From the PC 10, the sender accesses the above URL and proceeds with the member registration. FIGS. 9 through 14 show display screens for member registration.

FIG. 9 is a top screen of the video delivery service. If the sender does not yet have a user ID, the sender performs a user registration by pressing the "User registration" button. FIG. 10 is a screen to display the terms and personal information handling conditions. FIG. 11 is a screen to enter the device ID of a TV set of destination. In this display screen, a term "destination ID" which is easy to understand for the user is used instead of device ID. In the following, "destination ID" has the same meaning as "device ID". FIG. 12 is a screen to enter information for the receiver and the sender. FIG. 13 is a screen to confirm the entry.

FIG. 14 is a screen to indicate the tentative registration completed.

Upon the completion of the tentative registration, the server 30 registers the tentative registration contents into the unread e-mail check table 33. FIG. 5 shows an example of the unread e-mail check table 33. In the table, for each device ID, flags are provided to indicate whether there is a person waiting to be accepted as a sender and whether a new picture file has been transferred from an accepted sender. In this example, for the TV set with the device ID of "1234567", there are two senders requesting to be accepted and their user IDs (ID 1, ID 2) are specified. This example also indicates that an e-mail (actually, pictures) from an accepted user (ID 1) has arrived and the receiver of this TV set does not yet read the e-mail.

(3) Acceptance by the Receiver and Definite Member Registration (Steps S103, S104)

FIG. 15 shows an initial screen for the receiver to access from the TV set 20 to the server 30 in the center 3. This screen corresponds to the initial screen for the PC 10 upon connecting to the Internet. The access-destination address is stored in the TV set 20. In this screen, the video delivery service is shown as "Video delivery". The server 30 refers to the unread e-mail check table 33 in FIG. 5 and displays the status of a person waiting to be accepted as a sender and the status of a picture file transferred from an accepted sender on a screen that follows.

In a case where a sender who completed a tentative registration waits to be accepted by the receiver, the receiver may choose "video delivery service" on the screen of FIG. 15. The receiver may choose "video delivery service" by moving the cursor vertically and horizontally to it and pressing the Fix key or using a numeric keypad of the remote controller in which key numbers are associated with the services.

FIG. 16 is a screen to accept a sender. In this example, a text means that "as a person Taro completed a tentative registration, he wants you to accept him". The receiver decides whether or not to accept the sender and may choose "O=acceptance" or "X=rejection", using the remote controller of the TV set. If the receiver chooses "Δ=I don't decide about it", the receiver also may decide later whether or not to accept the sender (FIG. 32).

In a case where an accepted user has transferred a new picture file to the server, the screen shows "newly arriving e-mail: 1" as in FIG. 15 to indicate that there is a newly arriving picture. Then, the screen prompts the receiver to choose "video delivery" and open a received e-mail list. The term "e-mail" is used in the display screen. Because the TV set 20 does not have e-mail software installed, it does not receive e-mail technically. The wording "e-mail" is used, taking account of the easiness to understand for the user (sender, receiver).

When the receiver accepts the sender, the sender executes a definite registration from the tentative member registration and the server 30 adds the definite registration contents to the sender DB 34 and the receiver DB 35.

FIG. 6 shows an example of the sender DB. The tentative registration contents are inserted in the columns from "user ID" to "birth date" and the device ID (already entered at the tentative registration) of the TV set of the receiver who accepted to receive (permitted transmission) with the count of receivers=1 is registered upon the definite registration. Credit card number, expiry date, and join data entered by the user at the definite registration are additionally registered. Since transmission from a mobile phone is possible, columns for mobile phones are provided and these columns are filled when a mobile phone is added. The count of receivers=3 in FIG. 6 is due to that two receivers are added after the definite registration.

FIG. 7 shows an example of the receiver DB and receiver data is additionally registered upon the definite registration. Initially, the count of senders=1 is set and the user ID (user ID 5 in this case) of the sender permitted to transmit to the receiver is registered. Subsequently, the user count increments each time another sender is permitted to transmit to the receiver and its user ID (user ID 6 in this case) is added. As information identifying a person in the receiver DB, only the device ID and the name for display are possible to implement the service. However, taking account of possibility of later change to receiver charging, management for such change is facilitated by entry of address, name, telephone number, and birth date as well. At the registration screen of FIG. 12, these items of information may be entered by the user. FIG. 7 shows the contents of the database with these items of information added. Once sender data and receiver data are additionally registered in the sender DB and the receiver DB, the sender can transmit e-mail to the receiver.

When the receiver accepts the sender, the server transmits e-mail including a message "you has been accepted" to the sender and notifies the sender of URL of the site at which a definite registration can be executed. The sender enters this URL on the PC 10 and accesses a screen for definite registration. FIG. 17 shows an example of the screen for definite registration. The sender sets a password and a query and answer in case the sender forgot the password. Three courses, i.e., flat-rate basic, flat-rate high grade, and metered rate courses are set and the sender may choose one of them. In the flat-rate course, a fixed capacity of a hard disk can be used and a flat-rate charge is imposed. In the high grade course, the available capacity of a hard disk is larger. Meanwhile, in the metered-rate course, a fixed charge is imposed for one time of use of service up to a given capacity and the server 30 automatically removes the content after a predetermined period elapsed. Because sender charging is assumed in the first embodiment, the sender is requested to enter credit card number, expiry date, and security code on this registration screen. It is possible that the sender may be prompted to enter credit card information when executing a tentative member registration in the previous section (2). However, after card authentication is completed, the start of charging must be prevented, unless the sender is accepted by the receiver. In the first embodiment, the sender is prompted to enter credit card information at a definite registration after which charging can begin.

(4) Uploading Picture Files from PC (Step S105)

Upon the login done on the screen of FIG. 9 from the PC 10, a screen to create an e-mail as in FIG. 18 is displayed. Here, the sender may choose "Create e-mail" and select a receiver and an attached file. The names of accepted receivers are displayed in a "destination" (mandatory)" box in the middle of the screen. The sender may select a receiver(s) from among them. When choosing a check box, the check mark is displayed.

Figure 19:
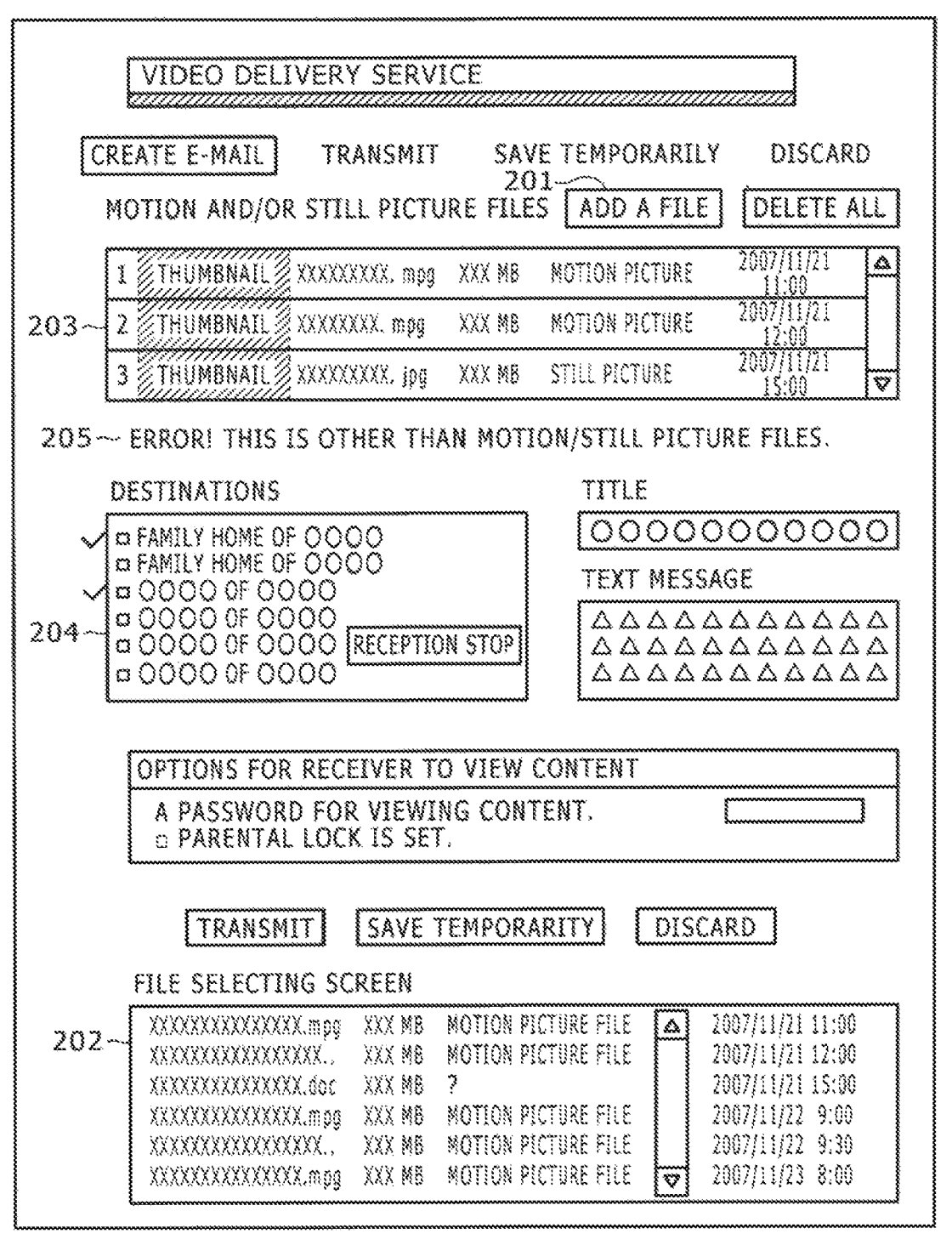

FIG. 19 shows the contents of an e-mail created. When pressing an "Add a file" button 201 in an upper section of the screen, a screen 202 to select a file from the files stored in the PC 10 is pop-up displayed. For graphical convenience, the file selecting screen 202 is shown in a lower section of the screen. From among these files, the sender may select a file that the sender wants to transmit. For the selected file, its file name with a thumbnail, together with the date of creation, is displayed in a file list 203 in the screen on the PC 10. In FIG. 19, an example where three attached files have been selected is shown. In the destination list 204, two receivers are selected as destinations from the list. In the list 204, a receiver attached with a "reception stop" mark denotes that the receiver sets the receiving mode to reject reception from the sender now by the user's intent, although once accepted the sender in the past.

Joining picture files transmitted into a single file is explained below. When video recording is performed with the video camera 11, a single motion picture file may be created for one scene from the recording start to a stop. In that case, when the picture file is copied from the video camera 11 to the PC 10, it is often divided into a plurality of files and information for one event such as a school athletic meet and a school play is composed of a plurality of files. In most cases, files associated with an event may be handled together. Thus, in such cases, the sender usually need to upload a plurality of files in one e-mail.

On the other hand, from the receiver's standpoint, when receiving one e-mail including a plurality of files like the above ones corresponding to the parts of a whole, it is convenient that a whole of the files can be reproduced in order by a single reproducing operation, rather than reproducing each of the files one by one by repeating the reproducing operation. Taking account of this point, in the first embodiment, in a case where the sender uploads a plurality of files at a time, the server 30 is configured to join these files. In the first embodiment, the server 30 joins the files in order in which the sender attached the files on the screen of FIG. 19 into a single file. Even after listing files in the file list 203 in FIG. 19, the list allows for reordering so that the files can be reordered by selecting a file. When the receiver reproduces the files, a set of the files joined in order as above will be reproduced.

In the first embodiment, picture files include motion pictures and still pictures. Because these pictures may be mixed and uploaded, the server handles the files as follows:

(a) If only motion picture files are transmitted at a time, the server 30 joins them in order in which they were attached into a single motion picture file.

(b) If only still picture files are transmitted at a time, the server handles them as separate files and does not join them. The files are displayed on the TV set one by one separately like icons.

(c) If motion and still picture files are mixed and transmitted at a time, the server joins the motion picture files in order in which they were attached into a single motion picture file until finding a still picture file. The server handles still picture files one by one, so that they are displayed in order in which the sender attached them. At the receiver side, One motion picture file is reproduced and still pictures are displayed such that one is displayed for several second and then another is displayed similarly (still pictures are displayed, while a motion picture is reproduced).

In the foregoing (a) to (c), motion pictures are joined into a single file, wherever possible, as described above. Needless to say, however, motion picture files may remain separate as is without being joined into a single file and they may be reproduced one by one in order in which they were attached.

A restriction can be imposed not to permit mixing of motion and still pictures in one e-mail. In that case, the sender is prompted to select either motion or still picture to be transmitted in an e-mail. By checking file extensions, if a file of a wrong type is attached, a warning message such as "the file is not motion picture (still picture)" is issued to the sender, so that attaching such a file is not accepted. In FIG. 19, an example of an error message 205 "this is other than motion/still picture files" is shown. In a case where both motion and still pictures are handled, if a file other than those is attached, the sender is alerted as in the above example. In a case where only motion (still) pictures are handled, if a file other than the specified type is attached, the sender is alerted by the appropriate error message.

When the sender wants to transmit video to a new receiver, by choosing "Add/Edit destinations" in FIG. 18, a screen to add and edit destinations as in FIG. 20 is displayed. The sender enters information for a new receiver and waits until it is accepted by the receiver. In a case where personal information such as address and name should be input, an item may be set to switch from the screen of FIG. 20 to the screen of FIG. 12 and enter such information.

(5) Picture Format Conversion (Step S106)

As for motion pictures, a file format of pictures stored in the PC 10 may not be always reproduced as is on the TV set 20, even if the file can be reproduced on the PC. The server 30 executes a picture format conversion to convert it into a file format that can be displayed on the TV set.

A motion picture file is generally constructed as follows. Primarily, there are a video elementary stream in which video signals are compressed and encoded and an audio elementary stream in which audio signals are compressed and encoded. Then, these streams are packetized and multiplexed into a system stream. This system stream is a motion picture file. In addition, information for rights about video and audio contents and other auxiliary information may be multiplexed together into the system stream.

Conversion of a file format of pictures stored in the PC 20 into a file format that can be displayed on the TV set is performed as follows. First, a system stream of a format of pictures stored in the PC 10 is demultiplexed into video and audio elementary streams. Then, the video elementary stream is decoded and then re-encoded into an elementary stream of a code format that is compatible with the TV set. For audio as well, similarly, decoding and re-encoding are performed. Then, the video and audio elementary streams resulting from the re-encoding are multiplexed into a system stream of a format compatible with the TV set. Thus, a converted motion picture file is created. In this way, the server converts the file format of pictures stored in the PC 10 into a motion picture file of a format that can be displayed on the TV set.

(6) Receiving and Viewing Pictures (Step S107)

The receiver chooses the video delivery service on the screen of FIG. 15. Following the screen to accept the sender as in FIG. 11, a received e-mail list display screen as in FIG. 24 is displayed. Using the remote controller, the receiver may move the cursor to any of icons #1 to #9, select a desired e-mail, and press the Fix button. If the selected e-mail is a set of still pictures, a picture list display screen as in FIG. 25 is displayed. When the receiver selects a desired picture by moving the cursor to any of icons #1 to #9, the selected picture is enlarged and displayed as in FIG. 26. If the picture content selected in FIG. 24 is a motion picture, the motion picture is reproduced full screen. Of course, the motion picture may be displayed in a part of the screen as in FIG. 26.

(7) Downloading and Erasing Pictures

If the TV set 20 has the storage 26 such as HDD, picture content existing on the server 30 can be downloaded and stored. When choosing a "Select and download" button in FIG. 24, a screen to select and download an e-mail as in FIG. 27 is displayed. When the receiver selects a desired icon and presses the Execute button, a confirmation screen as in FIG. 28 is displayed. When choosing "Yes", a screen indicating a download in process is displayed and content is stored into the HDD. Upon normal termination of the download, a screen indicating a download completed as in FIG. 30 is displayed. Upon abnormal termination of the download, the download failure is displayed on the screen.

In the first embodiment, because the receiver is authorized to erase content, a "Select and put in the recycle bin" button is displayed in FIG. 24. In the same procedure as for downloading, it is possible to select an icon and erase the content by pressing this button.

Of course, the sender may be authorized to erase content. The sender may identify and erase a motion picture file transferred to and have it preserved on the server from the PC operation history. In the previous section (5), picture file format conversion processing in the server 30 was described. In conjunction with this conversion processing, when file erasures should be performed and a file of which type of format should be erased are considered. For a certain picture file, an example where format A for PC A is converted into format B for TV set is considered. The server 30 preserves A and, after converting A into B, updates the unread e-mail check table 33 in FIG. 4 and the content management table in FIG. 8 and enables the receiver to view the content. According to timing when the sender issues a erase command, preferably, processing should be performed as follows.

(a) If the file remains as A, A is erased and no conversion processing is performed.

(b) During conversion from A into B, the conversion processing is stopped and both A and B being created are erased.

(c) After conversion into B, both A and B are erased, and the unread e-mail check table and the content management table are updated.

As described above, it is possible to authorize the sender and/or the receiver to erase files.

(8) Temporarily Rejecting the Reception (Step S107)

When choosing "Sender list" in FIG. 24, a sender list screen as in FIG. 31 is displayed. If the receiver chooses "I don't decide about it now" without rejecting the acceptance in FIG. 16, after selecting the video delivery server, when choosing "Sender list" in FIG. 24, the sender list including information for the sender waiting to be accepted is displayed as in FIG. 31. This TV set owner, after accepting two persons, Goro and Hanako as senders, temporarily rejected the reception from Hanako. Then, the receiver is requested from Taro to accept him as a sender. When pressing the Fix button with the cursor positioned in the row of Taro, a screen to accept a sender as in FIG. 32 is displayed and the receiver may choose "O=acceptance" or "X=rejection". When pressing the Fix button with the cursor positioned in the row of Goro, a screen to stop reception as in FIG. 33 is displayed and it is possible to change from a state in which "I receive video" to a state in which "I don't receive video". Conversely, when pressing the Fix button with the cursor positioned in the row of Hanako, a screen for Hanako is displayed and it is possible to change from a state in which "I don't receive video" to a state in which "I receive video" in a similar manner as in FIG. 32.

Although it is not necessary to enter a password on the TV screen in the first embodiment, needless to say, it is possible to prompt the receiver to set a password. One way of using the password is such that the receiver is prompted to enter the password when temporarily rejecting the reception or accepting the reception of video. It is also possible that, when the sender decides to put a parental lock on some video, the parental locked video content transmitted from the sender cannot be viewed unless the receiver enters the password that was set. Of course, such usage is possible that the sender sets a password on an e-mail and transmits the e-mail and the receiver cannot open it unless entering the password. In FIG. 19, an example is presented in which options to set a password and to set a parental lock are added.

Second Embodiment

In a second embodiment, the sender uploads content to the server 30 by using a mobile phone 50.

In the content delivery system shown in FIG. 1, the sender, once having registered with the server as a member, is able to transmit pictures captured by the mobile phone 50 to the TV set 20 of a receiver who accepted the sender. In this case, uploading pictures is performed using e-mail software installed in the mobile phone. The reason for this is as follows. It is practically possible to specify destinations and upload picture files to the server 30 without using e-mail software, as described in the previous section (4). However, specifications are likely to differ among carriers and mobile phone manufacturers and it is therefore supposed that a lot of man hours are required for testing. In the second embodiment, therefore, the system adopts a method of transmitting picture files to the server 30 using e-mail software installed in the mobile phone, wherever possible, avoiding proprietary specifications.

First, the sender registers a mobile phone 50 serving as a transmitting terminal with the server from the PC 10. When choosing "register/edit mobile phones" in the left part of FIG. 18 and FIG. 19, a screen to register/edit mobile phones as in FIG. 21 is displayed. Here, this example indicates that the e-mail addresses of nine mobile phones associated with one sender ID are registered. This screen allows a maximum of 10 addresses to be registered, taking account of the number of people in a family and a person who has two or more mobile phones. After entering the e-mail address of a mobile phone in an empty row and the name of a person who owns the mobile phone, press the Transmit button.

Scheme 1, Scheme 2, and Scheme 3 are possible as a method of transmitting content using a mobile phone.

<Scheme 1> A Method of Assigning e-Mail Addresses to all Receivers.

FIG. 22 is a PC screen to acquire URL to access the server 30 from the mobile phone 50. Acquiring URL is possible in the following three ways.

(a) URL is transmitted to the mobile phone 30 by e-mail. When the sender chooses a checkbox of a mobile phone 50 to which the sender wants to transmit URL, the sever 30 transmits the URL enabling login to the mobile phone 50.

(b) URL is obtained by causing a mobile phone 50 to read QR code displayed on the PC screen.

(c) Manually input URL into a mobile phone 50.

By means of (a) to (c), the mobile phone 30 can obtain URL or URL can be input to the mobile phone. A web screen to accept access from the mobile phone 50 is prepared on the server 30 and the mobile phone 30 accesses this URL and logs into the system.

FIG. 23 shows a screen to log in using the mobile phone 50. The sender logs into the system with the user ID acquired for the video delivery service and his or her password. The server 30 displays a list of receivers to which this sender can transmit content from the sender DB 34. Here, the server displays the names of the receivers registered by the sender (in the field "name of this destination" in FIG. 12) instead of displaying device IDs. The server 30 assigns an e-mail address to each receiver beforehand and stores it in the sender DB 34 and the receiver DB 35. When the sender selects a destination from among the receivers displayed on the screen of the mobile phone 50, the mailer is activated and the selected receiver's e-mail address is inserted in the TO (destination) field. Subsequently, the sender attaches a picture file(s) and transmits the e-mail according the method of transmitting an e-mail. Because no e-mail software exists in the TV set, the picture file(s) is actually transferred to the server 30. The server 30 determines which device ID to which the e-mail should be transmitted from the e-mail address of the receiver and the receiver DB. Subsequently, the server 30 preserves the picture file(s).

<Scheme 2> An Implementation Method with Only One e-Mail Address of the Server 30.

While scheme 1 assigns e-mail addresses to all receivers, scheme 2 uses only one e-mail address of the server 30. Although the e-mail addresses of receivers are described in FIG. 6 and FIG. 7, they do not exist in scheme 2. When any receiver is selected from among receivers P1 to P9 in FIG. 23, the mailer of the mobile phone is activated, specifying the e-mail address of the server 30 in the destination field. The server 30 recognizes the receivers P1 to P9, retrieves the device ID of the other party to which the sender wants to transmit content from the receiver DB, and describes the device ID of the receiver in the e-mail text. Upon arrival of the e-mail at the serer 30, the server recognizes the device ID described in the e-mail text and preserves the picture file(s).

<Scheme 3> A Method of Transmitting Receivers' e-Mail Addresses from the Server to the Mobile Phone.

Although e-mail addresses are assigned to all receivers as is the case for scheme 1, picture files are transmitted only with e-mail software incorporated in the mobile phone 30 and the web screen to accept access from the mobile phone 30 is not prepared on the server 30 in scheme 3. As in FIG. 22, the sender checks a check box of a mobile phone that the sender wants to use to transmit content. A button "transmit to the mobile phone destination e-mail addresses to be used for transmission from the mobile phone" (not shown in FIG. 22) is prepared. When the sender presses this button, the server 30 retrieves receivers to which the sender can transmit content from the sender DB and the e-mail addresses of the receivers assigned by the server 30 and the names of the receivers are transmitted to the selected mobile phone. From these e-mail addresses of the receivers, the sender selects an e-mail address on the mobile phone and activates the mailer.

In scheme 1 and scheme 3, despite that the TV set does not have e-mail software, the sender transmits e-mail in the same procedure as transmitting e-mail, but it actually transmits the e-mail to the server 30. Preferably, the sender can easily change the e-mail addresses assigned to the TV sets for security protection. When choosing "Add/Edit destinations" displayed in the left side of the screen in FIG. 21 and FIG. 22, the screen of FIG. 20 is displayed. On this screen, the sender can change or delete destination IDs and names and change e-mail addresses (assigned from the server 30). In the case of scheme 2, the address of the server 30 displayed when the mailer is activated should preferably be changed periodically and notified to the sender.

The example of transmitting content from a mobile phone 30 using standard e-mail software in view of work hours for testing was described. On the other hand, for uploading from PC, the example was described in which the web screen to accept access from PC is prepared on the server 30 and picture files are transmitted using this screen. This method is more usable, as it enables reordering picture files and provides a thumbnail display of a typical scene in each file. Needless to say, e-mail software installed in the PC 10 may be used to transmit content by the PC 10 in a similar manner as for the mobile phone 30.

Third Embodiment

In a third embodiment, a method of charging for the video deliver service" is described. There are two rate plans, i.e., flat-rate and metered-rate plans. In flat-rate charging, a service fee is fixed up to a certain capacity and a predetermined capacity of a hard disk is allocated to the user, if the user pays a fixed fee a month. On the other hand, in metered-rate charging, a user is charged a fee each time the user uses the service. Such a manner of operation is conceivable that, for example, a fee of 500 yen is set for using the service once up to 5 GB and the server 30 forcibly erases content after two weeks, regardless of whether the receiver may or may not view the content. The operator wants to make an efficient use of the system's shard disk capacity. Hence, if preserved content is delivered early to a receiver and the receiver erases the content, the server 30 can be operated efficiently, which is beneficial for the operator. Therefore, in metered-rate charging, the server checks the content management table of FIG. 8 before displaying the screen of FIG. 24, identifies a picture file preserved at a metered rate and may display a message such as "If you erase the file until mo O day O, the preservation fee will be half off." beside the file. If a receiver having a TV set with a self-contained hard disk downloads content early and erases it, this provides benefit for both the sender and the operator, as charges on the sender is reduced and the operator can utilize the system's hard disk resources efficiently.

Although sender charging is assumed in the third embodiment, receiver charging is also possible. In that case, when a user makes a tentative registration, the user may choose one of three types: (1) sender charging, (2) receiver charging, (3) basically, sender charging, but receiver is charged in case of extension of a period. In the cases of (2) and (3), prior to a definite registration, such a procedure should preferably be performed that the service provider sends a receiver by mail a form in which a draft on procedure, a credit card number and its expiry date, etc. should be written in by the receiver. It is possible to recommend receiver charging in the following way: when the screen of FIG. 24 is displayed, "expiry date mo 0 day 0" is displayed beside a picture file with an impending expiry date known from the receiver DB of FIG. 8; and, after the receiver reproduces the file or when the cursor is positioned at the picture file, a message such as "Would you like to change to receiver charging? A preservation fee of 00 yen a mount up to O gigabytes." is displayed. If (2) receiver charging or (3) receiver charging in case of extension of a period is chosen at a tentative registration, such charging is effected, as the charging procedure is completed. Only if (1) sender charging is chosen, the above procedure should be performed to recommend change to receiver charging. This method is effective for satisfying a receiver's need to view some more content than the capacity of the hard disk incorporated in the receiver's TV set by paying a fee.

Needless to say, it is possible to change the course (flat-rate, metered-rate), withdraw from membership, etc. by operating the PC 10.

The above-described charging methods are applicable to other embodiments with another server configuration which will be described later.

Fourth Embodiment

FIG. 34 is an example of an overall architectural diagram showing a content delivery system according to a fourth embodiment. This system is configured such that a transmitting terminal (PC 10), a receiving terminal (TV set 20), a delivery server (delivery server 30) which relays a content delivery between both terminals, and an authentication server (authentication server 70) are connected to a network 4 such as Internet. In this system, from the PC 10 having e-mail software, picture content belonging to the sender is transmitted to a TV set 20 having no e-mail software via the delivery server 30. Hereinafter, the content delivery service carried out by the center 3 (delivery server 30) will be referred to as "video delivery service".

The sender residing in the sender's home 1 copies picture content (hereinafter, also referred to as a picture file or video) captured by a video camera 11 or digital camera 12 to the PC 10. The PC 10 connects to the network 4 via routers (not shown) and transfers the picture to and has it preserved on the delivery server 30 situated in the center 3. The delivery server 30 preserves the picture transferred from the sender (PC 10) and waits for access from the TV set 20 in the receiver's home 2 of a receiver specified by the sender. After the TV set 20 connects to the authentication server 70 (described herein as the server operating as an entrance to all services, but another dedicated entrance sever may exist) situated in the center 3 via the routers and the network 4, when the receiver chooses "video delivery service", the TV set 20 receives the URL for the service together with a one-time ID from the authentication server 70, then connects to the delivery server 30 for "video delivery service" and transfers the one-time ID thereto. The delivery server 30 transfers the one-time ID received from the TV set 20 to the authentication server 70 and receives the receiver's device ID. If this ID matches with the receiver's device ID provided from the sender and preserved on the server, the deliver server 30 transmits a message indicating arrival of the picture to the TV set 20 and this message is displayed on the screen of the TV set 20. After that, the receiver can select, receive and view the picture. If the TV set 20 has a self-contained storage (e.g., a hard disk), the picture can also be downloaded.

In the system of the fourth embodiment, to identify the TV set 20 which is the receiving terminal, the device ID of each TV set 20 is used as an address. Besides picture transmission from the PC 10 in the sender's home, the sender can transmit a picture file captured by a mobile phone 50 which has been registered beforehand with the server from the mobile phone 50 to the deliver server 30 via the network 4, which will be described in a fifth embodiment.

Next, the delivery server 30, the authentication server 70, and the TV set 20 are described in detail regarding their internal structures. The internal structure of the delivery server 30 is the same as that of the server 30 in FIG. 2. The network transceiver 31 is connected to an external network 4 and communicates with the authentication server 70, PC 10, and TV set 20 via the network.

The member information manager 32 has data bases and tables, i.e., an unread e-mail check table 33, a sender DB 34, a receiver DB 35, a TV device DB 36, and a content management table 37 to store information for senders and receivers and preserved contents information. When the deliver server is accessed from a PC 10 or TV set 20, the member information manager 32 performs processing for member information verification, registration, or others, referring to a related database or table.

FIG. 35 is a diagram showing an exemplary internal structure of the authentication server 70.

A network transceiver 71 is connected to an external network 4 and communicates with the delivery server 30, PC 10, and TV set 20 via the network.

A member information manager 72 has a database and table, i.e., a TV device DB 76 and a one-time ID management table 77 to store information for TV devices and subscription service information. When the authentication server is accessed from a TV set 20 or a service server (e.g., delivery server 30), the member information manager 72 performs processing for device information verification, registration, or others, referring to a related database or table.

When the authentication server is access from the TV set 20 for the first time, the member information manager 72 registers the device ID of the TV set 20. When the receiver chooses a service, the member information manager 72 links the device ID with the selected service ID and registers both IDs into the TV device DB.

For example, if the deliver server 30 receives data for a tentative member registration from the PC 10 of a sender, the member information manager 32 registers information for device ID, user ID, etc. into the unread e-mail check table 33. If the deliver server receives a response as to whether the receiver accepts the sender from the TV set 20, the manager 32 updates the contents of the sender DB 34 and the receiver DB 35 according to the response. If the delivery server is accessed from a TV set 20, the manager 32 acquires a one-time ID issued from the server 70 from the TV set 20, queries the authentication server 70 for one-time ID matching, and acquires the device ID from the TV set 20. In this procedure, it can also verified at the same time whether or not the one-time ID is valid. The manager 32 compares the acquired device ID with information stored in the TV device DB 36 and verifies whether the device ID is valid. In case the device ID is invalid, the manager 32 detects the invalidity at this point of time and rejects subsequent processing for the TV set. The content management table 37 is used to manage preserved contents transferred from users and hold service agreements made with each user.

The content transceiver 38 receives picture content from the PC 10 and transmits picture content to the TV set 20. The content storage 39 stores picture contents received and to be transmitted. Specifically, the content transceiver 38 stores picture content uploaded from the PC 10 into the content storage 39 and, in response to a request from the TV set 20 for a picture to receive and view or a request to download a picture, reads the picture content from the content storage 39 and transmits it to the TV set 20.

FIG. 3 is a diagram showing an exemplary internal structure of the TV set 20. The network transceiver 21 is connected to an external network 4 and performs communication with the authentication server 70 and delivery server 30 via the network. The browser 22 renders screen information such as an e-mail screen and an acceptance screen and outputs it to a display 27 according to information described in a form of HTML, BML, etc. transmitted from the authentication server 70 and delivery server 30. The picture reproducer 23 decodes a still or motion picture file contained in picture content transmitted from the deliver server 30, reproduces the still or motion picture, and outputs it to the display 27.

The device ID sender 24 reads device ID information assigned to the TV set 20 from the device ID storage 25 and sends it to the authentication server 70. In the device ID storage 25, the device ID information specific to the TV set 20 is stored and retained. This device ID information is assigned to each terminal and written into the device ID storage 25 during the manufacturing of the TV set 20. When the user wants to know the device ID, the user can retrieve it and display on the display 27, e.g., by operating the remote controller.

The content storage 26 is, for example, a hard disk storage device and picture content received from the delivery server 30 is downloaded and stored into it. The user can read a picture stored and view it via the picture reproducer 23 at any time the user wants to do. The storage 26 may be either self-contained or external. The display 27 displays pictures and/or information output from the browser 22, picture reproducer 23, and device ID sender 24 on the screen.

A process flow of the content delivery service (video delivery service) of the fourth embodiment is described using FIG. 4. The process of the fourth embodiment is nearly the same as the process of the first embodiment and differences between this embodiment and the first embodiment are only described. In the flowchart of FIG. 4, the sever 30 for the first embodiment should be replaced with the delivery server 30.

Steps S101 to S106 are the same as for the first embodiment.

Step S107: When a receiver accesses the authentication server 70 from its TV set 20, an one-time ID is issued from the authentication server 70. The receiver transmits this ID to the delivery server 30 when accessing the delivery server 30. The delivery server 30 transmits the one-time ID received from the TV set 20 to the authentication server 70 and receives the device ID verified by device ID matching. The delivery server 30 looks through the unread e-mail check table 33 and checks the entry of the device ID. If an unread e-mail flag is set for the device ID of the accessing TV set 20, it means that the receiver has not yet received the e-mail (picture content). In that case, the delivery server 30 notifies the TV set 20 that pictures addressed to it arrived at the server. The receiver selects a desired picture, receives it from the delivery server 30, and views it on the TV set 20.

Steps S108 and S109 are the same as for the first embodiment.

In addition to the advantages provided by the server configuration of the first embodiment, the service provisioning by the server configuration according to the fourth embodiment further provides the following advantages:

(d) By establishing the authentication server as the management server specialized for TV devices, high load processing tasks can be assigned to the server for services to be added and it becomes possible to add a variety of services.

(e) By management of device IDs on the authentication server, information managed by the authentication server becomes simple and essential. The delivery server can concentrate on management of information relevant to the service and its processing also becomes essential. This facilitates the management of services.

(f) By direct access from TV sets to the authentication server (the authentication server is used as the entrance in the fourth embodiment), not only fraudulent services can be prevented, also secure service provision by double check can be achieved, as all services have to pass the device ID matching in the authentication server.

In the following, each of the steps of the content deliver service in FIG. 4 will be explained in greater detail. The process of the fourth embodiment is nearly the same as the process of the first embodiment and differences between this embodiment and the first embodiment are only described.

(1) Telling the Sender the Receiver's Device ID and Server's URL (Step S101)

Besides the first embodiment, at the authentication server 70 in this embodiment, the member information manager 72 in FIG. 35, after acquiring the converted device ID from the TV set, can restore it to the device ID being before converted, stored in the device ID storage 25 of the TV set by reverse conversion of the device ID converted in the TV set. The member information manager 72 stores the reconstructed device ID into the database at the first time access from the TV set. An example of the device ID DB is shown in FIG. 36. The device ID is used to manage each device ID and a service ID being used by the device. For the one-time ID that is used for device ID matching queried from the deliver server 30, the authentication server 70 issues, deletes, and manages it as a unique ID linked with the device ID and service ID. FIG. 37 shows the one-time ID management table.

The TV set owner tells the other party (his or her family, friends, relatives, etc.) from whom he or she wants a video transmission the converted device ID of his or her TV set and the URL of the portal (server) of the service provider by telephone or fax and requests the other party to make a member registration for the "video delivery service".

(2) Tentative Member Registration (Step S102)

The sender executes a member registration (tentative) for the "video delivery service", using the converted device ID and the server's URL acquired from the receiver. The PC 10 of the sender is equipped with the browser 22 and the following operations are performed by the browser. From the PC 10, the sender accesses the above URL and proceeds with the member registration. The delivery server 60 restores the converted device ID entered by the sender to the device ID and then registers the latter into the DB. FIGS. 9 through 14 show the display screens for member registration. In these display screens, the term "destination ID" which is easy to understand for the user is used instead of converted device ID. In the following, "destination ID" has the same meaning as "converted device ID". Other descriptions about member registration are not repeated, because they are the same as for the first embodiment.

(3) Acceptance by the Receiver and Definite Member Registration (Steps S103, S104)

When the receiver accepts the sender, the sender executes a definite registration from the tentative member registration and the deliver server 30 adds the definite registration contents to the sender DB 34 and the receiver DB 35.

FIG. 6 shows an example of the sender DB. The tentative registration contents are inserted in the columns from "user ID" to "birth date" and the device ID (restored from the converted device ID entered at the tentative registration) of the TV set of the receiver who accepted to receive (permitted transmission) with the count of receivers=1 is registered upon the definite registration. Others are the same as for the first embodiment.

(4) Uploading Picture Files from PC (Step S105)

Uploading is performed in the same way as for the first embodiment.

(5) Picture Format Conversion (Step S106)

Picture format conversion is performed the same way as for the first embodiment.

(6) Receiving and Viewing Pictures (Step S107)

Using the TV set 20, the receiver connects to the authentication server 70 (also serving as the portal site). The TV set encrypts and transmits data in which the device ID and authentication data are combined to the authentication server 70. The authentication data termed herein is, inter alia, information representing the device type such as, e.g., the manufacturer name and model number of the TV set 20. In this embodiment, information representing the device type is referred to as a model ID. The authentication server 70 extracts the authentication data and device ID from the encrypted data and checks whether those satisfy conditions for connection (whether those correspond to a connectable device type and registered device ID). If rejecting the connection, the authentication server 70 returns an error t the TV set; if permitting the connection, it transmits the top page (the screen of FIG. 15) to the TV set 20 and this page is displayed on the TV set 20.

When choosing the video delivery service on this screen, the TV set 20 receives from the authentication server 70 the URL of the delivery server 30, which is necessary to connect to the service and the one time ID issued by the authentication server 70 (the one-time ID is issued by the member information manager 72 of the authentication server 70, when requested from the TV set 20 or the like, registered in the one-time ID management table 77, and transmitted from the network transceiver 71 to the requesting device, i.e., the TV set 20 or the like). Using this information, the TV set 20 connects to the delivery server 30 and transmits the one-time ID.

The delivery server 30 transmits this one-time ID to the authentication server 70 and the authentication server 70 checks the entry of the one-time ID in the one-time ID management table 77. Further, the authentication server 70 checks the TV device DB 76 from the device identifying ID that can be obtained from the one-time ID management table 77. It checks whether the device is associated with a service ID corresponding to the service provided by the delivery server 30. If the service ID is not registered, the authentication server 70 may return an error.

If the error is returned from the authentication server 70, the delivery server 30 returns to the TV set 20 information indicating that the device is unable to connect to the service. If the device ID can be acquired from the authentication server 70 properly, the delivery server 30 refers to the entry of the device ID in the TV device DB 36. It matching is verified, the delivery server 30 transmits information to display the screen to accept the sender 11.

The above-described authentication will be detailed later. Following the screen to accept the sender as in FIG. 11, the TV set 20 displays the received e-mail list display screen as in FIG. 24. Using the remote controller, the receiver may move the cursor to any of icons #1 to #9, select a desired e-mail, and press the Fix button. If the selected e-mail is a set of still pictures, a picture list display screen as in FIG. 25 is displayed.

When the receiver selects a desired picture by moving the cursor to any of icons #1 to #9, the selected picture is enlarged and displayed as in FIG. 26. If the picture content selected in FIG. 24 is a motion picture, the motion picture is reproduced full screen. Of course, the motion picture may be displayed in a part of the screen as in FIG. 26.

(7) Downloading and Erasing Pictures

Downloading and erasing pictures are performed in the same way as for the first embodiment.

In the fourth embodiment also, the sender can upload content to the delivery serve 30 using a mobile phone 50, as is the case for the second embodiment.

According to the fourth embodiment, the server manages devices by device ID, but sends the user the converted device ID for service use. This merit is avoiding an accident that an erroneous ID input by the sender causes transmission of content to an unintended user or device.

Here, the authentication process in the fourth embodiment is explained below.

FIG. 38 is a flowchart illustrating an authentication flow for the content delivery service of this embodiment.

Step S201: When the receiver accesses the portal site, the receiving terminal (TV set 20) transmits to the authentication server 70 authentication data (e.g., the model ID indicating the device type) and the device ID (ID specific to the device, e.g., a production number) together through a secure channel (e.g. SSL communication channel). A cookie function provided in the browser of the receiving device may be used.

Step S202: In the authentication server 70, the member information manager 72 is responsible for various processing tasks. In the authentication server 70, authentication data is retrieved and it is verified whether the device can make use of the service (cookie may be subjected to a validity check). The TV device DB 76 is referred to check if the device ID is registered. If the device is judged as invalid or unsupported, the authentication server 70 notifies the receiving terminal of that judgment.

If, for example, authentication data is a model ID indicating the type of the device, and if the model ID denotes a product made by the manufacturer (service provider), it is judged that the device can make use of the service. The model ID of the device that can make use of the service is stored in a model ID information DB, which is not shown, in the authentication server 70.

A device ID is associated with a service ID registered in the TV device DB 76. It is checked whether the service requested by the accessing user is associated with the device ID of the TV set 20 used by the user.

The receiving terminal presents a result of authentication to the user with a display or the like. If the receiver's device is authenticated properly, the authentication server 70 issues and one-time ID that is used for query from the delivery server 30. Accordingly, in case a terminal makes access falsifying a part of information for the receiving terminal, the authentication server 70 rejects this and abuse can be prevented.

Step 203: The authentication server 70 maintains the one-time ID in the one-time ID management table 77 and transmits to the receiving terminal the one-time ID together with URL information of the service server (e.g., delivery server 30) selected by the user. If no access has been made from the receiver for a certain period of time, the one-time ID may be deleted.

Step 204: The receiving terminal transmits the one-time ID received from the authentication server 70, when making access to the service.

Step 205: In the delivery server 30, the member information manager 32 is responsible for various processing tasks. The delivery server 30 transmits the one-time ID to the authentication server 70.

Step 206: the authentication server 70 searches the table for a match with one-time ID received from the delivery server 30. If the once-time ID registered is not found, the authentication server 70 returns an error; if it is found, the authentication server 70 returns the device ID. The one-time ID entry once verified is deleted to invalidate it for second time and subsequent access. This enables secure authentication avoiding false impersonation.

Step 207: The delivery server 30 searches the database for a match with the device ID received from the authentication server 70. Once having verified that the device ID belongs to the user joined the service, the delivery server 30 starts the service provision to the receiving terminal. That is, it begins the delivery of content.

Step 208: The receiving terminal starts to receive and store or reproduce content from the delivery server 30.

Fifth Embodiment

The previously described embodiments, the authentication server 70 authenticates a device or user by using the device ID as the ID for management. In the fifth embodiment, a unique ID (hereinafter, referred to as device identifying ID) that is generated using the device ID is used to cope with a case where the user replaces the device for using the service. This provides the following advantages:

(1) It is prevented that the device recycled by replacement or the like is used by a third party fraudulently.

(2) database expansion is prevented, as the server does not need to manage unnecessary IDs.

As above, it is possible to further improve the operability of the system. Then, the following will describe the embodiment where this device identifying ID is used.

In the authentication server 70, the member information manager 72 issues a unique device identifying ID that does not match another ID issued as appropriate and registers it into the database (TV device DB 76). FIG. 39 shows an example of the TV device DB. FIG. 40 shows an example of the one-time ID management table. In the TV device DB 76, device identifying ID, device ID, and service ID of a service being used by the user are managed. In the one-time ID management table, device identifying ID, one-time ID, and service ID are managed.

FIG. 41 is a flowchart illustrating a process flow regarding device identifying ID. The process is described below in order of steps.

Step S301: The user accesses the authentication server 70 (also serving as the portal server herein) to which the receiving terminal (TV set 20) is connected in order to display the initial screen (FIG. 15) to use services. The TV set 20 transmits authentication data and the device ID to the authentication server 70.

Step S302: The authentication server 70 refers to the contents of the TV device DB 76 based on the above information (the authentication data and the device ID of the TV set 20), verifies whether the ID has been registered, and prepares initial screen information suitable for the receiving terminal.

Step S303: The authentication server 70 transmits this initial screen information to the TV set 20 herein via the network transceiver 71. The TV set 20 receives this by the network transceiver 21 and displays it to the display 27 via the browser 22.

Step S304: The user may choose the issuance of device identifying ID or the deletion of device identifying ID directly from the initial screen or through a menu or the like.

Step S305: If the user has chosen the issuance of device identifying ID, the member information manager 72 of the authentication server 70 issues a unique ID not matching another device identifying ID and registers this ID into the TV device DB 76 in which the ID is associated with the device ID received from the TV set 20. The authentication server 70 transmits screen information to notify the issued device identifying ID to the TV set 20 via the network transceiver 71. An example of the screen that is displayed on the TV set 20 is shown in FIG. 42, where the top page means the initial screen.

Although not shown, if the user does not yet have a device identifying ID, e.g., when using this service for the first time, a screen shown in FIG. 43 may be displayed to prompt the user to get a device identifying ID, thus providing for further usability. When the user chooses a "Acquire device identifying ID" button in FIG. 43, the authentication server 70 issues a device identifying ID as described above. This screen also allows the user to make sure of the device identifying ID for the purpose of telling the sender this ID and for other reasons.

Step S306: If the user has chosen the deletion of device identifying ID, the authentication server 70 transmits screen information to confirm the deletion to the TV set 20 via the network transceiver 71. An example of the screen that is displayed on the TV set 20 is shown in FIG. 44, where "Initialize" is equivalent to "delete". Here, when the user chooses "Initialize", the member information manager 72 of the authentication server 70 deletes the information related to the registered device identifying ID from the TV device DB 76. Although not shown, a screen indicating that the ID was deleted may be displayed on the TV set 20 or the display may return to the initial screen. In the screen shown in FIG. 44, when the user has chosen "Not initialize", the display returns to the initial screen.

Then, the service using the device identifying ID is explained. The overall architecture of the content delivery system according to the fifth embodiment is the same as shown in FIG. 34.

In the system of this embodiment, in order to identify a TV set 20 which is a receiving terminal, the device identifying ID of each TV set 20 is used as an address. For consistency, device identifying IDs are to be transmitted to the authentication server 70 and delivery server 30 and to be told to senders. Thereby, it is easy to cope with user device replacement or the like, as already mentioned, and high operability is maintained. Not only from the PC 10 in the sender's home, the sender can also transmit a picture file captured by a mobile phone 50, registered with the server beforehand, to the delivery server 30 via the network. This is implemented in the previously described manner in the system described in the fourth embodiment, where device ID is replaced by device identifying ID, and repeated description is omitted.

Next, descriptions are provided for the structures of the databases and the like within the delivery server 30 and the authentication server 70.

FIG. 45 shows an example of the unread e-mail check table 33. In the table, for each device ID, flags are provided to indicate whether there is a person waiting to be accepted as a sender and whether a new picture file has been transferred from an accepted sender. In this example, for the TV set with the device identifying ID of "1234567", there are two senders requesting to be accepted and their user IDs (ID 1, ID 2) are specified. This example also indicates that an e-mail (actually, pictures) from an accepted user (ID 1) has arrived and the receiver of this TV set does not yet read the e-mail.

FIG. 46 shows an example of the sender DB. The tentative registration contents are inserted in the columns from "user ID" to "birth date" and the device identifying ID (already entered at the tentative registration) of the TV set of the receiver who accepted to receive (permitted transmission) with the count of receivers=1 is registered upon the definite registration. Credit card number, expiry date, and join data entered by the user at the definite registration are additionally registered. Since transmission from a mobile phone is possible, columns for mobile phones are provided and these columns are filled when a mobile phone is added. The count of receivers=3 in FIG. 46 is due to that two receivers are added after the definite registration.

FIG. 47 shows an example of the receiver DB and receiver data is additionally registered upon the definite registration. Initially, the count of senders=1 is set and the user ID (user ID 5 in this case) of the sender permitted to transmit to the receiver is registered. Subsequently, the user count increments each time another sender is permitted to transmit to the receiver and its user ID (user ID 6 in this case) is added. As information identifying a person in the receiver DB, only the device identifying ID and the name for display are possible to implement the service. However, taking account of possibility of later change to receiver charging, management for such change is facilitated by entry of address, name, telephone number, and birth date as well. At the registration screen of FIG. 12, these items of information may be entered by the user. FIG. 47 shows the contents of the database with these items of information added. Once sender data and receiver data are additionally registered in the sender DB and the receiver DB, the sender can transmit e-mail to the receiver.

FIG. 48 shows a content management table in which device identifying ID, the count of received files for the receiver of the device identifying ID, the names of the files, the User IDs of the senders of the files, rate plans subscribed to by the senders, and their expiry date are managed.

Other methods for using the service are the same as described in the above-described embodiments, excepting that the device ID changes to the device identifying ID. So, repeated descriptions are omitted.

As noted from the above, users, the authentication server, and the delivery server can operate only with device identifying IDs, the usability of users is improved, and the management of the service provider is facilitated.

Sixth Embodiment

The above-described system has the advantage that the management of the authentication server can be made simpler. However, no consideration is taken for usability in a case where a single user has two or more devices and for usage in which a single device is used by multiple users (e.g., shared by a family). To cope with this problem, in a system of a sixth embodiment, member ID device as well as identifying ID are managed. This system is described below.

The overall architectural diagram of the content delivery system according to the six embodiment is the same as shown in FIG. 34, except for an authentication server 80 replacing the authentication server 70. This system is configured such that a transmitting terminal (PC 10), one or more receiving terminals (TV sets 20), a delivery server (delivery server 30) which relays a content delivery between both terminals, and an authentication server (authentication server 80) are connected to a network 4 such as Internet. In the previously described "video delivery service", from the PC 10 having e-mail software, picture content belonging to the sender is transmitted to a TV set 20 having no e-mail software via the delivery server 30.

Then, the authentication server 80 is described in detail regarding its internal structure.

FIG. 49 is a diagram showing an exemplary internal structure of the authentication server 80.

A network transceiver 81 is connected to an external network 4 and communicates with the delivery server 30, PC 10, and TV set 20 via the network.

A member information manager 82 has databases and a table, i.e., a member DB 85, a TV device DB 86 and a one-time ID management table 87 to store information for members, TV devices and subscription service information. When the authentication server is accessed from a TV set 20 or a service server (e.g., delivery server 30), the member information manager 82 performs processing for device information verification, registration, or others, referring to a related database or table.

FIG. 50 is a diagram showing contents that are managed in the member DB 85.

A primary member denotes a member that primarily makes use of the service and this member is assumed to be the owner of the device. Primary member ID, password, and device identifying ID are managed in the member DB. As a management DB, taking account of extension in future, name for display, address, name, telephone number, birth date, credit card number and its expiry date in preparation for an integrated charging service, etc. may be managed in this DB.

FIG. 51 is a diagram showing contents that are managed in the TV device DB 86.

In the TV device DB, device identifying ID, device ID, primary member ID, and child member ID are managed.

FIG. 52 is a diagram showing contents that are managed in the one-time ID management table 87.

In this table, device identifying ID, device ID, and one-time ID are managed.

The member information manager 82 has a cross-reference function with regard to the above DBs and table.

For example, for an e-mail address that is used for delivery service or the like, the member information manager 82 generates an address of a combination of an device identifying ID and a member ID, when a member registration is executed, and registers this address together with other information into the DB. This enables implementation of a service in which, when a user specifies a device identifying ID and a member ID for, e.g., "video delivery service" or the like, the server transmits a video to a particular member specified in members sharing a device.

A member registration procedure is described below.

As described in the previously described embodiments, a user registers a device identifying ID on the TV set 20. As for service ID, when the user chooses a service, the device identifying ID and the service ID of the selected service are linked together and registered into the TV device DB. By the operation up to now, the device identifying ID is registered into the TV device DB 86.

FIG. 53 is a flowchart illustrating a process flow regarding member ID registration in the sixth embodiment. The process is described below in order of steps.

Step S401: A user accesses the authentication server 80 to which the receiving terminal (TV set 20) is connected in order to display the initial screen (FIG. 15) to use services.

The TV set 20 transmits authentication data and the device ID to the authentication server 80.

Step S402: The authentication server 80 refers to the contents of the TV device DB 86 based on the above information (the authentication data and the device ID of the TV set 20), verifies whether the ID has been registered, and prepares initial screen information suitable for the receiving terminal.

Step S403: The authentication server 80 transmits this initial screen information to the TV set 20 herein via the network transceiver 81. The TV set 20 receives this by the network transceiver 21 and displays it to the display 27 via the browser 22.

Step S404: The user may choose to register member ID or delete member ID directly from the initial screen or through a menu or the like.

Step S405: If the user has chosen to register member ID, the authentication server 80 transmits member ID registration screen information to the TV set 20. An example of the screen that is displayed on the TV 20 is shown in FIG. 54, where the top page means the initial screen.

Step S406: When the user enters necessary information according to the screen and choose a "Register" button in the screen, the member information manager 82 of the authentication server 80 registers the member ID into the member DB 85 and the TV device DB 86. An example of this input screen is shown in FIG. 55. This screen also allows the user to check his or her member ID for the purpose of telling the sender the member ID for other reasons. In the case of first time registration, the authentication server 80 may present a unique ID to the user. If the user is a registered member, the user may manually enter and register a member ID.

Although not shown, if the user has entered other personal information, or if a match with registered information has been detected, the authentication server 80 may transmit a screen including information like the table in FIG. 52 to present registered member IDs and present the screen to the user. If a primary member registration is not yet done, the authentication server 80 displays a screen including a masking or message display indicating that the user cannot register a child member on the TV set 20 to inhibit the registration.

Step S407: If the user has chosen to delete a member, the member information manager 82 of the authentication server 80 verifies the device identifying ID and transmits screen information to confirm deletion, including a list of deletable members, to the TV set 20 via the network transceiver 81.

Step S408: An example of the screen that is displayed on the TV set 20 is shown in FIG. 56, where the top page means the initial screen. Here, when the user choose a "Delete" button, the member information manager 82 of the authentication server 80 deletes information relevant to the registered member ID from the member DB 85 and the TV device DB 86. Although not shown, a screen for password input may be displayed to reconfirm the deletion before executing the deletion. After the deletion, a screen indicating that the member ID was deleted may be displayed on the TV 20 or the display may return to the initial screen.

As noted from the above, by linking and managing member information and device identifying ID on the authentication server 80, detailed management of services on a per-user basis even for users sharing a device can be accomplished. In a case where a single user has multiple devices, it is possible to make management of services that may be accessed from multiple devices by a single user.

Although the management using device identifying ID has been discussed in this embodiment, such management can be realized only using device ID, but not using device identifying ID. If device identifying ID is not used, procedures between the TV set 20 and the authentication server/delivery server use device ID.

Then, services that are managed using both member ID and device identifying ID are described below. In case where the sender transmits content, specifying a member, a message can be received by entering the member ID and password on the receiving device.

In the system of this embodiment, in order to identify a TV set 20 which is a receiving terminal, the device identifying ID of each TV set 20 is used as an address. As destination information, by specifying information that is a combination of a device identifying ID and a member ID as an address, it is possible to transmit content to the specified device and the specified member. For consistency, device identifying IDs are to be transmitted to the authentication server 80 and delivery server 30 and to be told to senders. Thereby, it is easy to cope with user device replacement or the like, as already mentioned, and high operability is maintained. Not only from the PC 10 in the sender's home, the sender can also transmit a picture file captured by a mobile phone 50, registered with the server beforehand, to the delivery server 30 via the network. This is implemented in the previously described manner in the system described in the fifth embodiment, where device ID is replaced by device identifying ID, and repeated description is omitted.

Next, operation by sender for "video delivery service" is descried below.

Although a basic flow is as previously described, particularly when the sender wants to transmit to a member, the sender have to enter not only a device identifying ID, also a member ID (operation without entering a member ID is the same as described previously).

In the process for content delivery service in FIG. 4, when making a tentative member registration (step S102), a screen that is shown in FIG. 57 is provided, which is the screen to enter a device identifying ID of a TV set and a member ID as destination information for services that are managed using member ID in the sixth embodiment. In this display screen, a term "destination ID" which is easy to understand for the user is used instead of device identifying ID. The term "destination ID" has the same meaning as "device identifying ID". When a member ID has been entered, subsequently, the destination ID and member ID columns are displayed in other screens. Because the operating procedure and the like are the same as described previously, repeated description is omitted.

Device ID, content (file name), and member ID are associated with each other and managed in the content management table. As destination information, by specifying information that is a combination of a device identifying ID and a member ID as an address, the content sender can transmit content to the specified member having a given member ID. Such information is managed in the content management table.

The delivery server 30 receives a member ID and password transmitted from the TV set 20 and transmits content associate with the member ID and device ID to the TV set 20.

A receiver can send a member ID to the delivery server 30 when requesting a delivery of content. Alternatively, a receiver may send his or her member ID to the authentication server 80 when accessing it for the first time, and the authentication server 80 may issue a one-time ID for each member ID. If it issues a one-time ID for each member ID instead of each device ID, a TV set 20 may send only the one-time ID when requesting the delivery server for a delivery.

Seventh Embodiment

Further, descriptions are provided for a delivery service for content comprising text information (which is hereinafter referred to as a message) (hereinafter, the service is referred to as a message delivery service in this embodiment) by a portal server, wherein the service is managed using member ID and device identifying ID. The overall architectural diagram for this embodiment is the same as shown in FIG. 34, except for an authentication server 80 replacing the authentication server 70. This system is configured such that a transmitting terminal (PC 10), a receiving terminal (TV set 20), and a center 3 (a portal server comprising an authentication server 80) which relays a content delivery between both terminals are connected to a network 4 such as Internet. In this system, from the PC 10 having e-mail software and web browser software, a message is transmitted to the TV set 20 via the center 3. Hereinafter, the message delivery service carried out by the center 3 will be referred to as "memo messaging service".

The following description assumes that the above-mentioned device identifying ID of each device and the member ID of each member are registered in the previously described embodiment.

By operating the PC 10 connected to the network 4 via routers (not shown), the sender residing in the sender's home 1 accesses a page prepared by e-mail software or the authentication server 80 and transmits a message to the authentication server 80. The authentication server 80 preserves the message transferred from the sender (PC 10) and waits for access from the TV set 20 in the receiver's home 2 of a receiver specified by the sender.

After the TV set 20 connects to the authentication server 80 (described herein as the server operating as an entrance to all services, but another dedicated entrance sever may exist) situated in the center 3 via the routers and the network 4, when the receiver chooses "memo messaging service", the authentication server 80 transmits a message indicating arrival of a "memo message" to the TV set 20 and this message is displayed on the screen of the TV set 20.

After that, the receiver can select, receive, and read the "memo message". If the TV set 20 has a self-contained storage (e.g., a hard disk), the message can also be downloaded. Particularly, when the sender transits a message, specifying a member, the message can be received by entering a password corresponding to the member ID on the receiving device.

In the system of this embodiment, in order to identify a TV set 20 which is a receiving terminal, the device identifying ID of each TV set 20 is used as an address. As destination information, by specifying information that is a combination of a device identifying ID and a member ID as an address, it is possible to transmit a message to the specified device and the specified member. For consistency, device identifying IDs are to be transmitted to the authentication server 80 and to be told to senders.

Thereby, if the device identifying ID of a device used by the receiver is registered in the authentication server 80, the authentication server 80 refers to the database, retrieves the device identifying ID belonging to the receiver, even if the receiver is not registered, directly linked with the device identifying ID, and transmits the message which, in turn, can be received by the receiver. It is possible to provide the message delivery service with high usability.

Not only from the PC 10 in the sender's home, the sender can also transmit a message to the authentication server 80 even from a mobile phone 50 via the network 4.

This service may be implemented by providing a dedicated service server, as in the previously described embodiments. In that case, the operation procedure and the flow for communication with the server are the same as for "video delivery service". Communication among restrictive users becomes possible and a service that is more secure and handles a wider spectrum of data can be provided. Herein, the following description assumes that simple text information is used as a memo message and the database managed on the authentication is configured to have additional functions of managing messages and senders.

As the simplest configuration, a possible method is that the authentication server 80 as a portal server transmits operating screens to the device used by the sender by making use of a function (e.g., HTTP server function) that is used to transmit initial and other screens. Because a normal receiver entrance also serves for device authentication, a dedicated entrance for PCs 10 and mobile phones 50 is provided.

FIG. 58 is a flowchart illustrating a process flow to transmit a message by "memo messaging service" in the seventh embodiment. The process is described below in order of steps.

Step S501: The sender accesses a "memo messaging service" transmission page on the authentication server 80, using the PC 10.

Step S502: The authentication server 80 transmits "memo message" input page information to the terminal PC 10 of the sender.

Step S503: The PC 10 displays the "memo messaging service" transmission page received from the authentication server 80 and the sender inputs a message and a destination (device identifying ID and member ID) to this page. A screen that is shown in FIG. 59 is the message input screen to enter a device identifying ID of a TV set and a member ID as destination information for services that are managed using member ID in the seventh embodiment.

In this display screen, a term "destination ID" which is easy to understand for the user is used instead of device identifying ID. The term "destination ID" has the same meaning as "device identifying ID". After input, the sender chooses a "transmit" button, then the PC 10 transmits the message to the authentication server 80. Here, a confirmation screen as shown in FIG. 60 may be displayed, so that the message will be transmitted after the sender confirms the message transmission.

Step S504: The authentication server 80 registers the message received from the sender's terminal (PC 10).

FIG. 49 is a diagram showing an exemplary internal structure of the authentication server 80. However, the TV device DB 86 in this figure is replaced by a TV device DB 96 in this embodiment.

The network transceiver 31 is connected to an external network 4 and communicates with a PC 10 and a TV set 20 via the network.

The member information manager 92 has data bases and a table, i.e., a member DB 85, a TV device DB 96, and a one-time ID management table 87 to store information for members and TV devices and subscription service information. When the server is accessed from a PC 10 or TV set 20, the member information manager 92 performs processing for device information verification, registration, or others, referring to a related database or table.

FIG. 61 is a diagram showing contents that are managed in the TV device DB 96.

In this DB, device identifying ID, device ID, primary member ID, child member ID, and messages registered by "memo messaging service" and their sender information (e.g., e-mail address) are managed.

Now, the authentication server 80 completes registering a message from a sender using the "memo messaging service".

FIG. 62 is a flowchart illustrating a process flow to receive a message by "memo messaging service" in the seventh embodiment. The process is described below in order of steps.

Step S601: Using a receiving terminal, a user accesses the authentication server 80 to which the receiving terminal (TV 20) is connected. The TV 20 transmits authentication data and the device ID to the authentication server 80.

Step S602: The authentication server 80 refers to the contents of the TV device DB 96 based on the above information (the authentication data and the device ID of the TV set 20), verifies whether the ID has been registered, and prepares initial screen information suitable for the receiving terminal.

Step S603: The authentication server 80 searches the TV device DB 96 for the device ID received in the above step and retrieves a primary member ID associated with the device ID. Based on the primary member ID, the server searches the member DB 85 and retrieves all device identifying IDs associated with the member ID. The server searches the TV device DB 96 again and retrieves information for messages and senders relevant to all retrieved device identifying IDs.

Here, there is no relevant message, the process goes to step S604. If there is the relevant message(s), the process goes to step S605.

Step S604: The server transits normal initial screen (FIG. 15) information to the TV set 20 herein via the network transceiver 31. The TV set 20 receives this by the network transceiver 21 and displays it to the display 27 via the browser 22.

Step S604: If there are multiple relevant messages, the server transmits "memo messaging" message list screen information which is shown in FIG. 63 to the TV set 20 via the network transceiver 31. The TV set 20 receives this by the network transceiver 21 and displays it to the display 27 via the browser 22. When the receiver selects a desired message, a "memo messaging" message display screen shown in FIG. 64 is displayed.

If there is one relevant message, the "memo messaging" message display screen in FIG. 64 may be displayed, skipping the list screen in FIG. 63.

If the message(s) is intended for a given member, only if the user has entered a correct password corresponding to his or her member ID via a password input screen in FIG. 65, the "memo messaging" message display screen in FIG. 64 may be displayed.

Even if there is one or more relevant messages, a message list or a message display screen may be displayed via the normal initial screen (FIG. 15).

As noted from the above, the following advantageous effects are obtained.

For example, in a case where a user who is a receiver (of course, one person may be a sender and a receiver) has multiple TV sets 20 in his or her home, assume that a TV set 20 placed in a living room is A and a TV set 20 placed in a den is B. Even if a sender has transmitted a "memo messaging" message, specifying the device identifying ID of the TV set B as a destination, the user can receive this message, when accessing the portal server from the TV set A place in the living room.

If the authentication server 80 is provided with a dedicated entrance for TV sets capable of using the "memo messaging service" in this embodiment, for example, the following function can be realized: while the user is viewing the TV, the TV set receives a message by accessing the dedicated entrance by background operation and superimposes it on the TV screen.

Further, an example of application of the "memo messaging service" managed using both member ID and device identifying ID to the "video delivery service" is presented below.

The overall architectural diagram of the content delivery system is the same as shown in FIG. 34, except for an authentication server 80 replacing the authentication server 70. This system is configured such that a transmitting terminal (PC 10), another transmitting terminal (mobile phone 50), a receiving terminal (TV set 20), a delivery server (delivery server 30) which relays a content delivery between both terminals, and an authentication server (authentication server 80) are connected to a network 4 such as Internet. In the previously described "video delivery service", from a PC 10 or mobile phone 50 having e-mail software, picture content belonging to the sender is transmitted to a TV set 20 having no e-mail software via the delivery server 30.

In step S105 of the process flow of the content delivery service (video delivery service) shown in FIG. 4, by carrying out the following processing, the above application can be realized.

By operating the PC 10, the sender specifies a receiver who accepted to transmit to and transmits (uploads) pictures captured by the video camera or the digital camera to the delivery server 30. The delivery server 30 stores the pictures transferred from the PC 10 into the content storage 39. Then, the server preserves them until arrival of a request to receive from the specified receiver. At the same time, the sender transmits to the authentication server 80 a "memo messaging" message that the sender has content addressed to the device identifying ID of the receiver preserved on the delivery server.

Accordingly, when the user accesses the portal server from the receiving terminal and uses "memo messaging service", the user can know that there is content addressed to the user's terminal, received by "video delivery service".

Further, in step S603 of the process flow to receive a message by "memo messaging service" in the seventh embodiment shown in FIG. 62, by carrying out the following processing, a message can be transmitted to only a receiver who uses the delivery service.

The authentication server 80 searches the TV device DB 96 for the device ID received in the previous step and retrieves a primary member ID associated with the device ID. Based on the primary member ID, the server searches the member DB 85 and retrieves all device identifying IDs associated with the member ID. The server searches the TV device DB 96 again, extracts those associated with a delivery service ID from all retrieved device identifying IDs, and retrieves information for messages and senders relevant to those.

Accordingly, when the user accesses the portal server from the receiving terminal and uses "memo messaging service", the user can know that there is content addressed to the user's terminal, received by "video delivery service", only if, in a set of member IDs associated with the receiving terminal user, there is at least one member ID who uses "video delivery service".

A content delivery system comprising a transmitting terminal, a receiving terminal, and a delivery server which are connected via a network and configured to transmit content from the transmitting terminal to the receiving terminal via the delivery server, the delivery server comprising a database for registering device IDs, each identifying each receiving terminal, a content storage for temporarily storing contents transmitted from transmitting terminals, and a table for sorting and managing contents by receiver terminal's device ID and by sender. In response to a request from a receiving terminal, the delivery server refers to the table and transmits content destined to the receiving terminal's device ID to the receiving terminal.

According to the first to seventh embodiments described previously, a content delivery method for transmitting content transmitted from a transmitting terminal to a receiving terminal via a delivery server is provided. The method comprises registering a device ID identifying a receiving terminal with the delivery server; sorting and managing contents by the delivery server, wherein the contents transmitted from transmitting terminals are sorted by receiver terminal's device ID to which each content is destined; in response to a request from a receiving terminal, transmitting by the delivery server a content destined to the receiving terminal's device ID to the receiving terminal.

A delivery server storing content transmitted from a transmitting terminal and transmitting the content to a receiving terminal, comprising: a database for registering a device ID identifying a receiving terminal, a content storage for temporarily storing contents transmitted from transmitting terminals, and a table for sorting and managing contents by receiver terminal's device ID and by sender. In response to a request from a receiving terminal, the delivery server refers to the table and transmits content destined to the receiving terminal's device ID to the receiving terminal.

A receiving terminal that receives content transmitted from a transmitting terminal via a delivery server is also provided. The receiving terminal comprises a device ID storage for storing a device ID identifying the receiving terminal; a selector for selecting a content to receive or a content sender; and a display for displaying received content. By sending the device ID of the receiving terminal to the delivery server, the receiving terminal acquires and displays a list of contents destined to the receiving terminal, stored on the delivery server, or a list of senders.

A content delivery system comprising a transmitting terminal, a receiving terminal, a delivery server, and an authentication server which are connected via a network and configured to transmit content from the transmitting terminal to the receiving terminal via the delivery server, the delivery server comprising a database for registering device IDs, each identifying each receiving terminal, a content storage for temporarily storing contents transmitted from transmitting terminals, and a table for sorting and managing contents by receiver terminal's device ID and by sender. The authentication server stores user information such as the device ID of a device owned by a user and service IDs, temporarily issues and stores a one-time ID, and comprises a table for associating the one-time ID with the user information. In response to a request from a receiving terminal, the delivery server refers to the table and, after obtaining authentication as to whether the receiving terminal's device ID is a valid ID by the authentication server, transmits content destined to the receiving terminal's device ID to the receiving terminal.

In order to transmit content transmitted from a transmitting terminal to a receiving terminal via the delivery server, a device ID identifying a receiving terminal is registered with the delivery server. The delivery server sorts and manages contents transmitted from transmitting terminals by receiver terminal's device ID to which each content is destined. In response to a request from a receiving terminal, the delivery server, after receiving from the receiving terminal a one-time ID issued by the authentication server and obtaining authentication by the authentication server using the one-time ID, transmits content destined to the receiving terminal's device ID to the receiving terminal.

An authentication method in which a delivery server for storing content transmitted from a transmitting terminal and transmitting the content to a receiving terminal, the delivery server comprising a database for registering device IDs, each identifying each receiving terminal, a content storage for temporarily storing contents transmitted from transmitting terminals, and a table for sorting and managing contents by receiver terminal's device ID and by sender, the delivery server, in response to a request from a receiving terminal, after obtaining authentication by the authentication server using an one-time ID issued by the authentication server, refers to the device ID table for a device ID received and transmits content destined to the receiving terminal's device ID to the receiving terminal.

An authentication server comprising a table for verifying a service associated with user information from information comprising authentication data and a device ID received from a device. The authentication server issues a one-time ID which is used by a delivery server for authentication, temporarily stores a one-time ID associated with a receiving device, and authenticates the one-time ID when the receiving terminal is receiving content transmitted from a transmitting terminal via the delivery server.

A receiving device comprising a device ID storage for storing a device ID which is used by a delivery server to identify the receiving terminal; a selector for selecting a content to receive or a content sender; and a display for displaying received content. The receiving device, by sending the receiving terminal's authentication data and device ID to the authentication server, receives a one-time ID and, then, transmits the one-time ID to the delivery server. The delivery server transmits the one-time ID to the authentication server and receives the receiving device ID. The receiving device acquires and displays a list of contents destined to the receiving terminal, stored on the delivery server, or a list of senders.

BRIEF DESCRIPTION OF THE DRAWINGS

FIG. 5 shows an example of an unread e-mail check table.
FIG. 6 shows an example of a sender DB.
FIG. 7 shows an example of a receiver DB.
FIG. 8 shows an example of a content management table.
FIG. 9 shows an example of a login/user registration screen at a sending side.
FIG. 10 shows an example of a user registration screen (to very the terms).
FIG. 11 shows an example of a user registration screen (to specify a destination).
FIG. 12 shows an example of a user registration screen (to enter member information).
FIG. 13 shows an example of a user registration screen (to confirm the entry).
FIG. 14 shows an example of a user registration screen (tentative registration completed).
FIG. 15 shows an example of an initial screen for connecting to the server at a receiving end.
FIG. 17 shows an example of a screen for a definite user registration.
FIG. 18 shows an example of a screen to create an e-mail.
FIG. 19 shows an example of a created e-mail.
FIG. 20 shows an example of a screen to add/edit destinations.
FIG. 21 shows an example of a screen to register/edit mobile phones.
FIG. 32 shows an example of a screen to accept a sender.
FIG. 33 shows an example of a screen to accept/reject reception.
FIG. 37 shows an example of a one-time ID management table.
FIG. 39 shows an example of a TV device DB for management using device identifying ID.
FIG. 40 shows an example of a one-time ID management table for management using device identifying ID.
FIG. 46 shows an example of a sender DB for management using device identifying ID.

FIG. 47 shows an example of a receiver DB for management using device identifying ID.

FIG. 48 shows an example of a content management table for management using device identifying ID.

FIG. 50 shows an example of a member DB.

FIG. 51 shows an example of a TV device DB for management using member ID.

FIG. 52 shows an example of a one-time ID management table for management using member ID.

FIG. 54 shows an example of a screen to register and confirm a member ID.

FIG. 55 shows an example of a screen to newly register a member ID.

FIG. 56 shows an example of a screen to delete a member ID.

FIG. 57 shows an example of a user registration screen (to specify a destination for management using member ID).

FIG. 59 shows an example of a message input screen to enter a device identifying ID and a member ID.

FIG. 60 shows an example of a screen to confirm message transmission.

FIG. 61 shows an example of a TV device DB for management using member ID.

LIST OF REFERENCE NUMERALS

Figure 1:
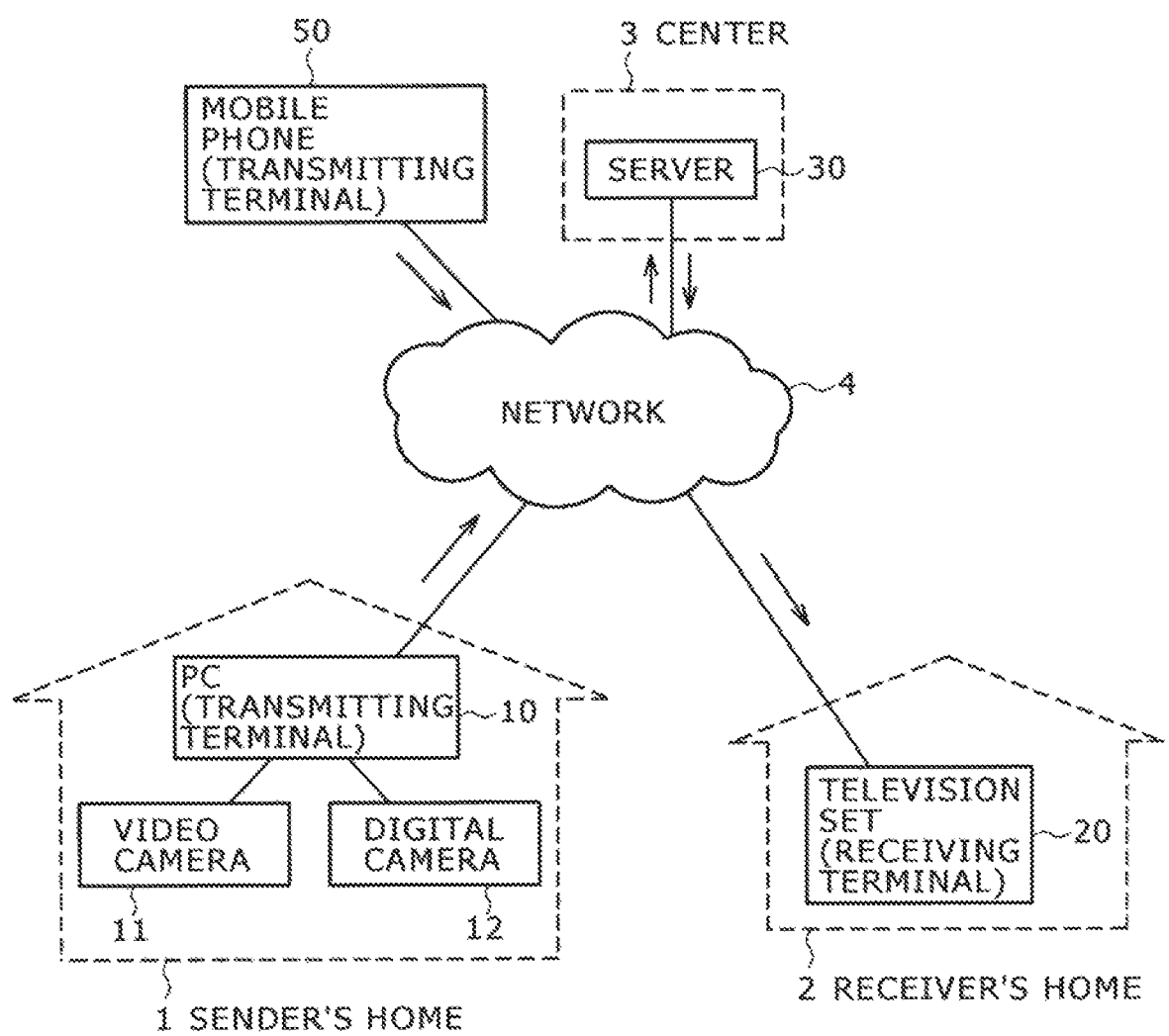
FIG. 1 is an overall architectural diagram showing an exemplary embodiment of a content delivery system.
Figure 2:
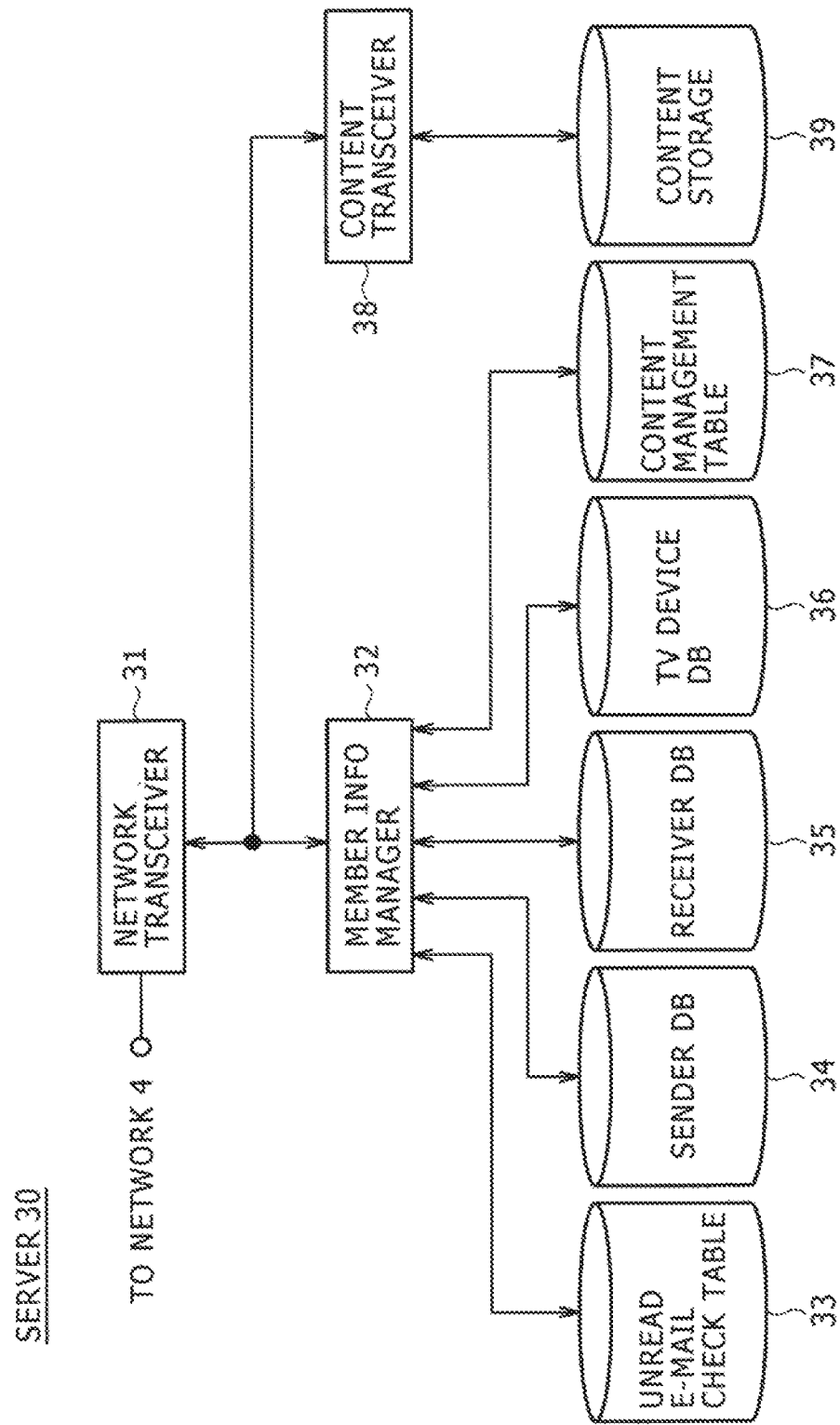
FIG. 2 is a diagram showing an exemplary internal structure of a server 30.
Figure 3:
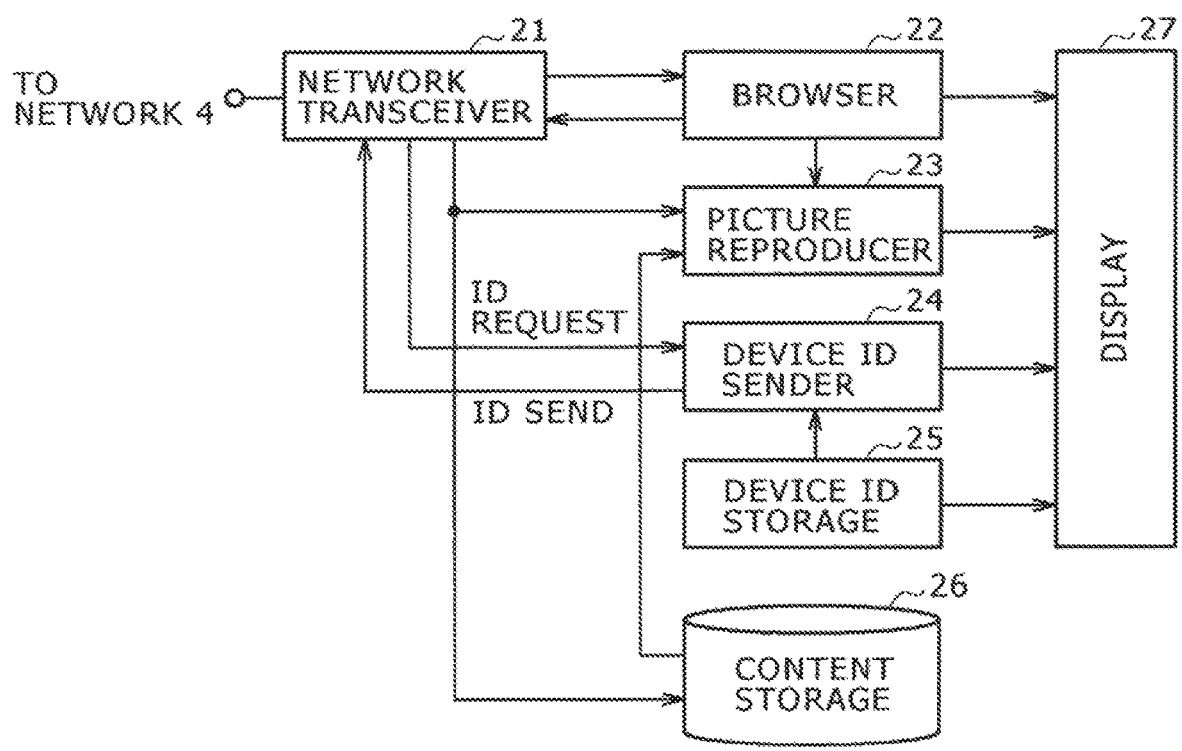
FIG. 3 is a diagram showing an exemplary internal structure of a TV set 20.
Figure 4:
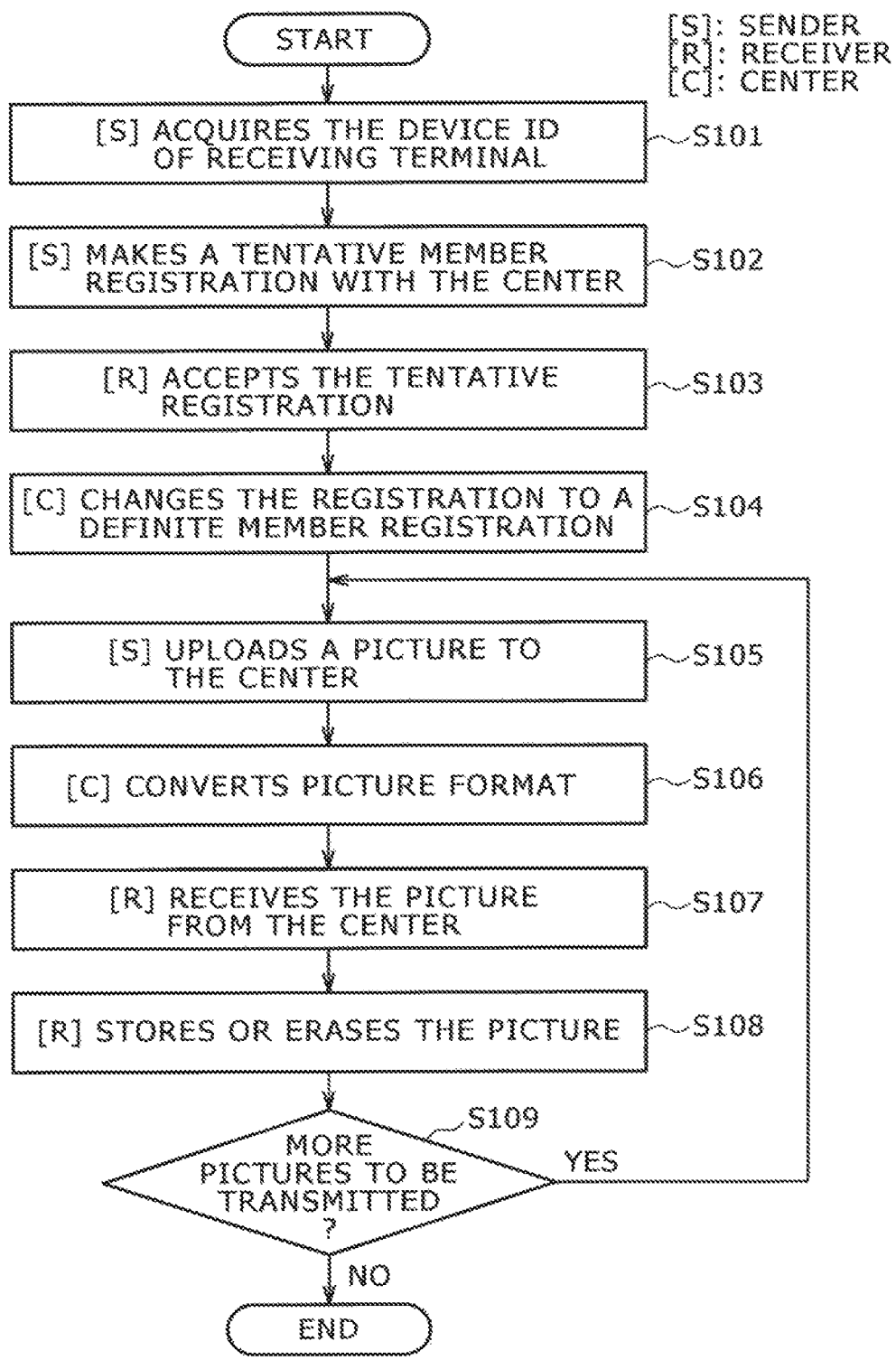
FIG. 4 is a flowchart illustrating a process flow of a content delivery service.
Figure 16:
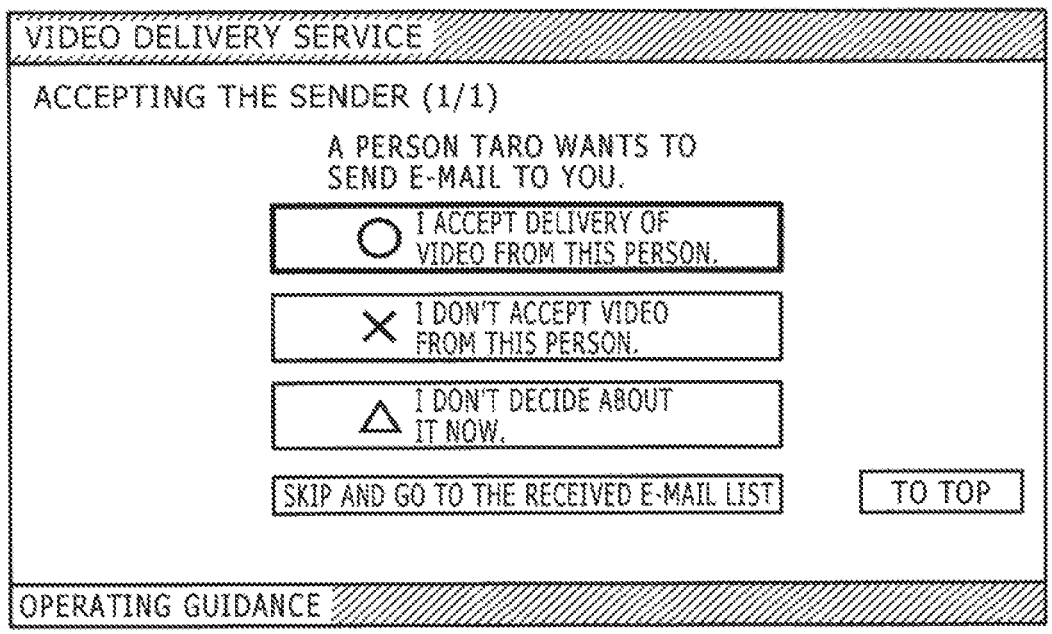
FIG. 16 shows an example of a screen to accept a sender.
Figure 22:
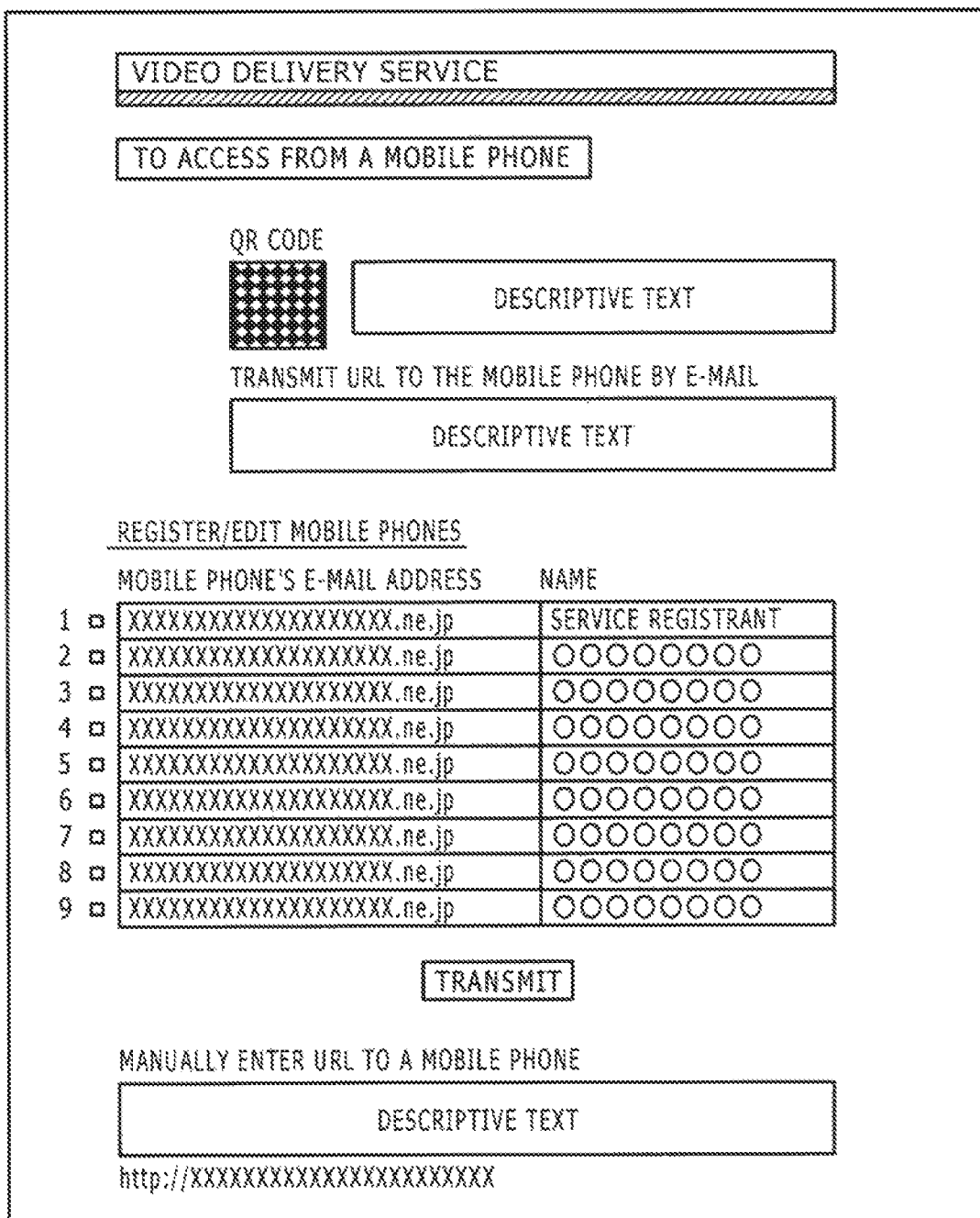
FIG. 22 shows an example of a screen to access from a mobile phone.
Figure 23:
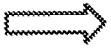
FIG. 23 shows an example of a screen to transmit an e-mail from a mobile phone.
Figure 24:
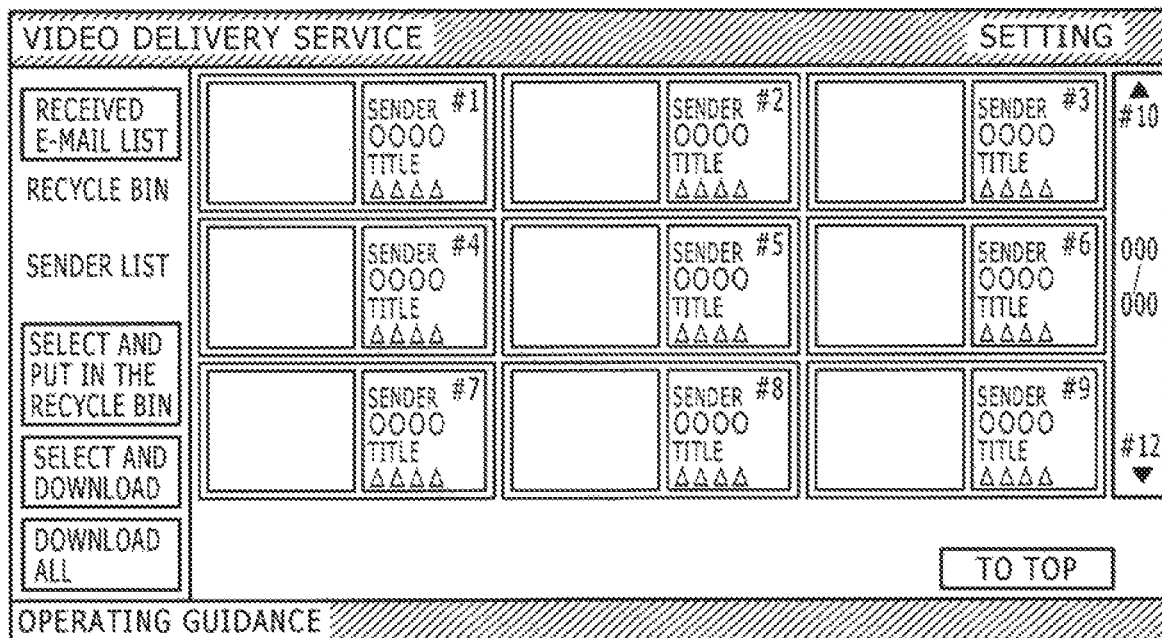
FIG. 24 shows an example of a received e-mail list display screen.
Figure 25:
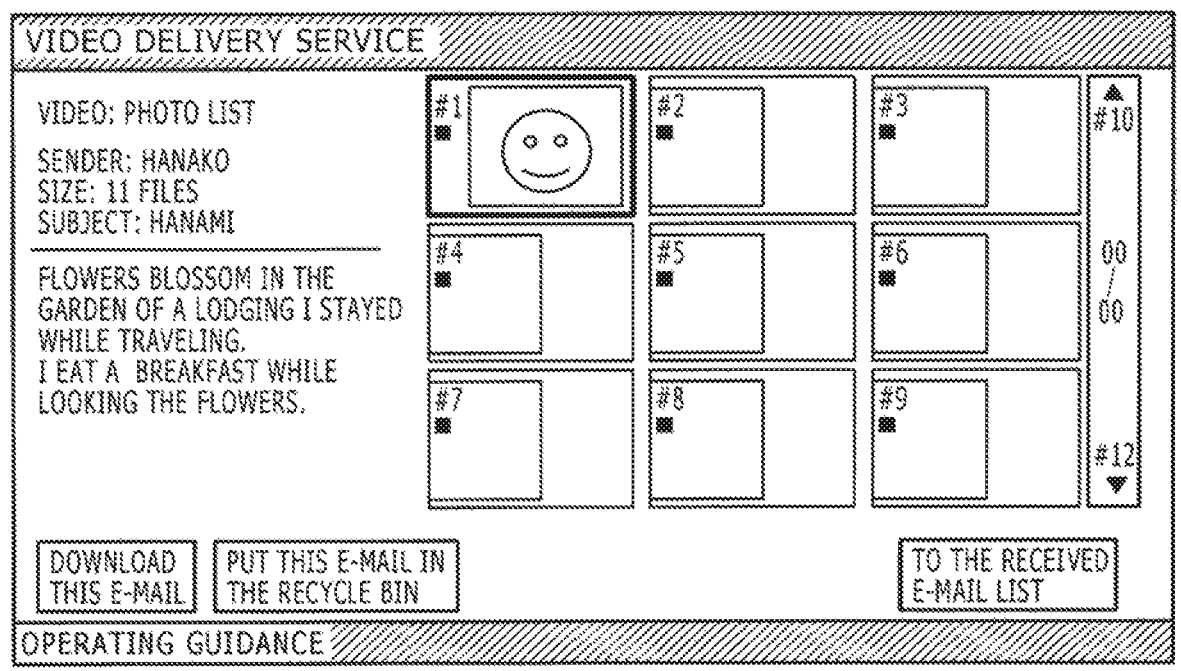
FIG. 25 shows an example of a still picture list display screen.
Figure 26:
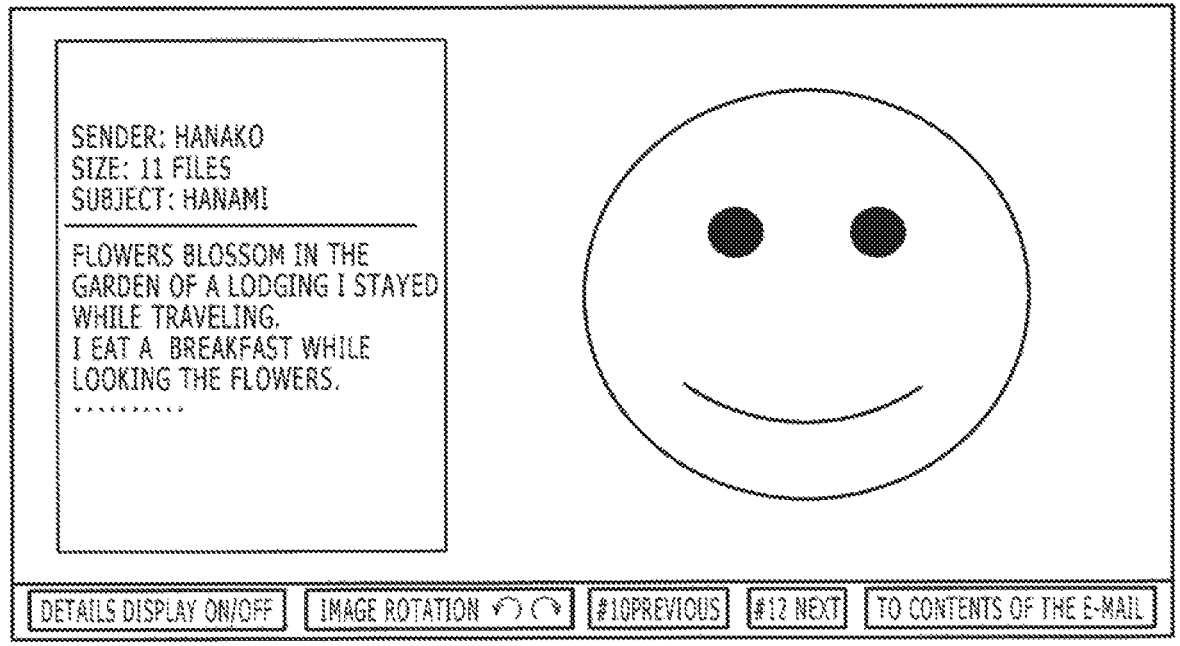
FIG. 26 shows an example of a screen reproducing a motion and/or still picture.
Figure 27:
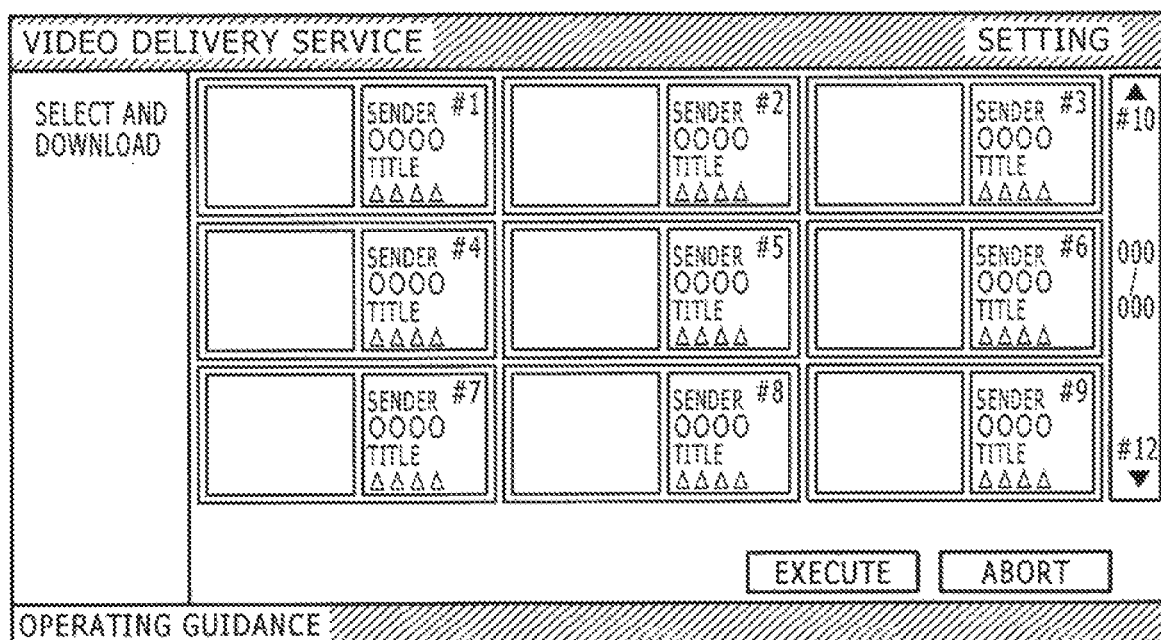
FIG. 27 shows an example of a screen to select and download an e-mail.
Figure 28:
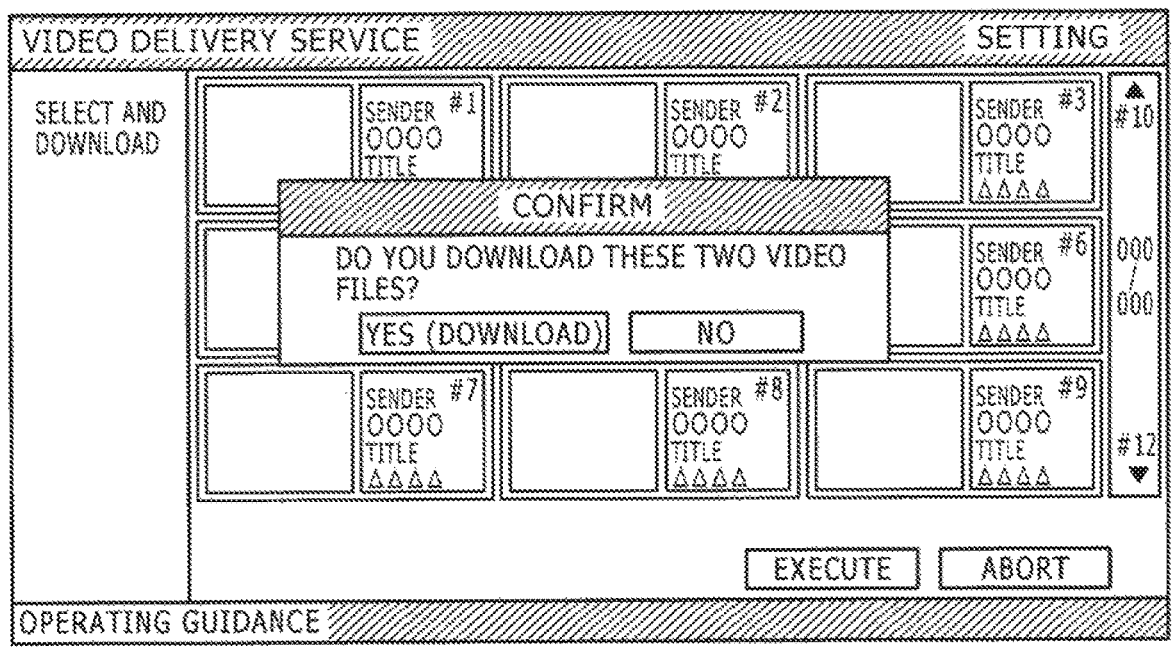
FIG. 28 shows an example of a screen to confirm the execution of downloading.
Figure 29:
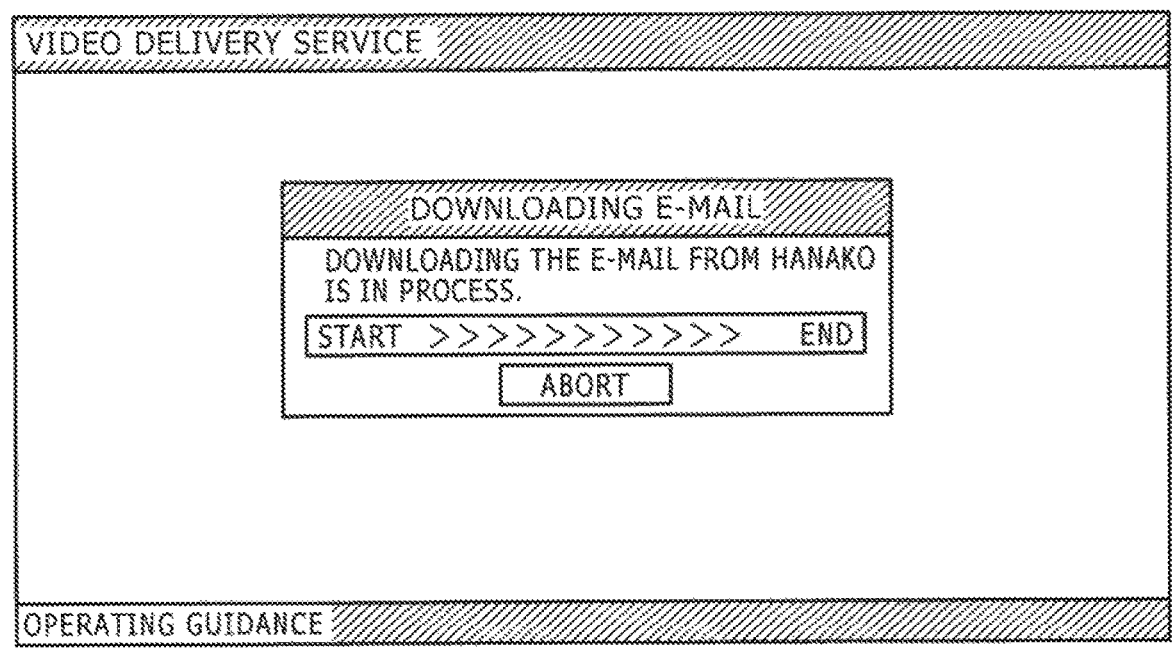
FIG. 29 shows an example of a screen indicating a download in process.
Figure 30:
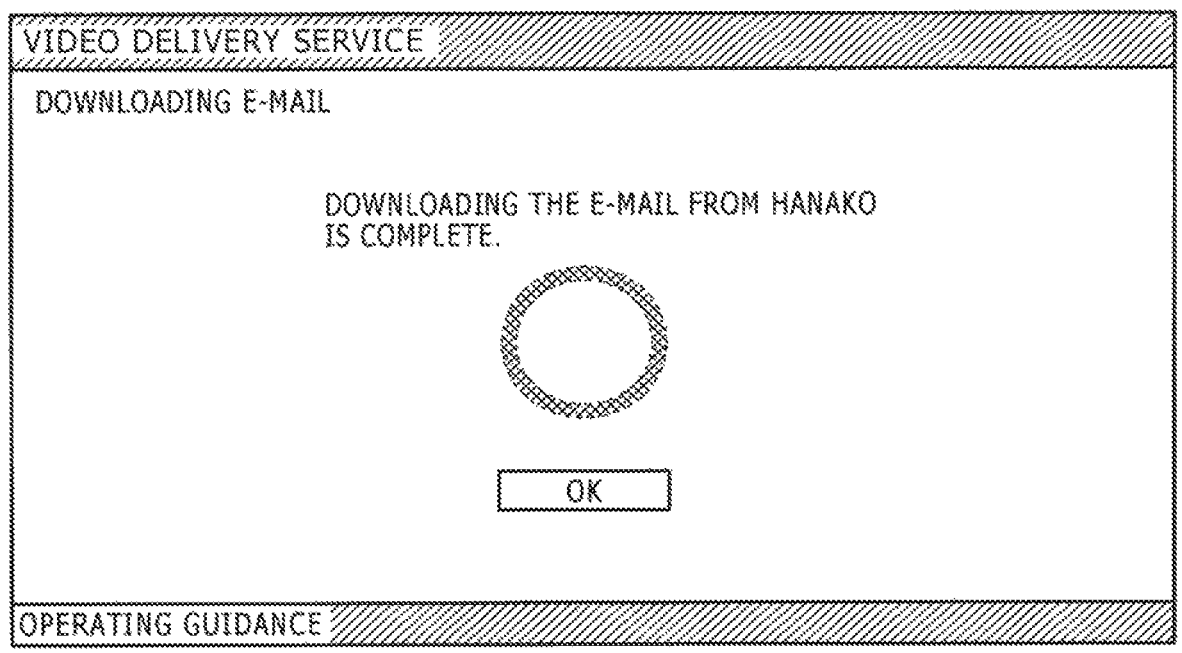
FIG. 30 shows an example of a screen indicating a download completed.
Figure 31:
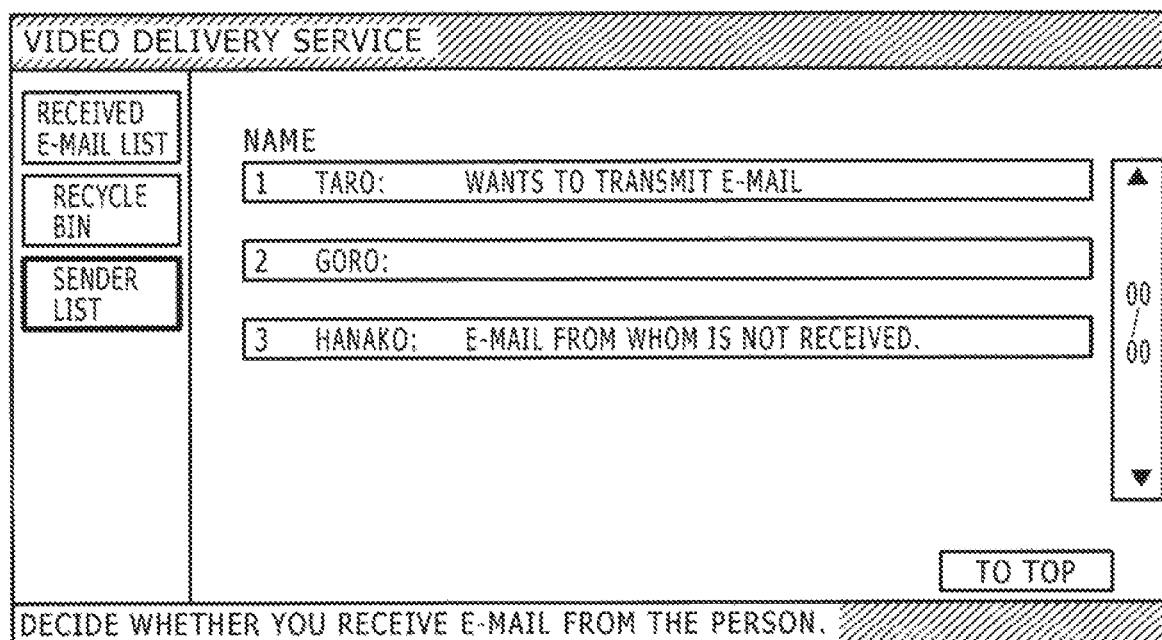
FIG. 31 shows an example of a sender list display screen.
Figure 34:
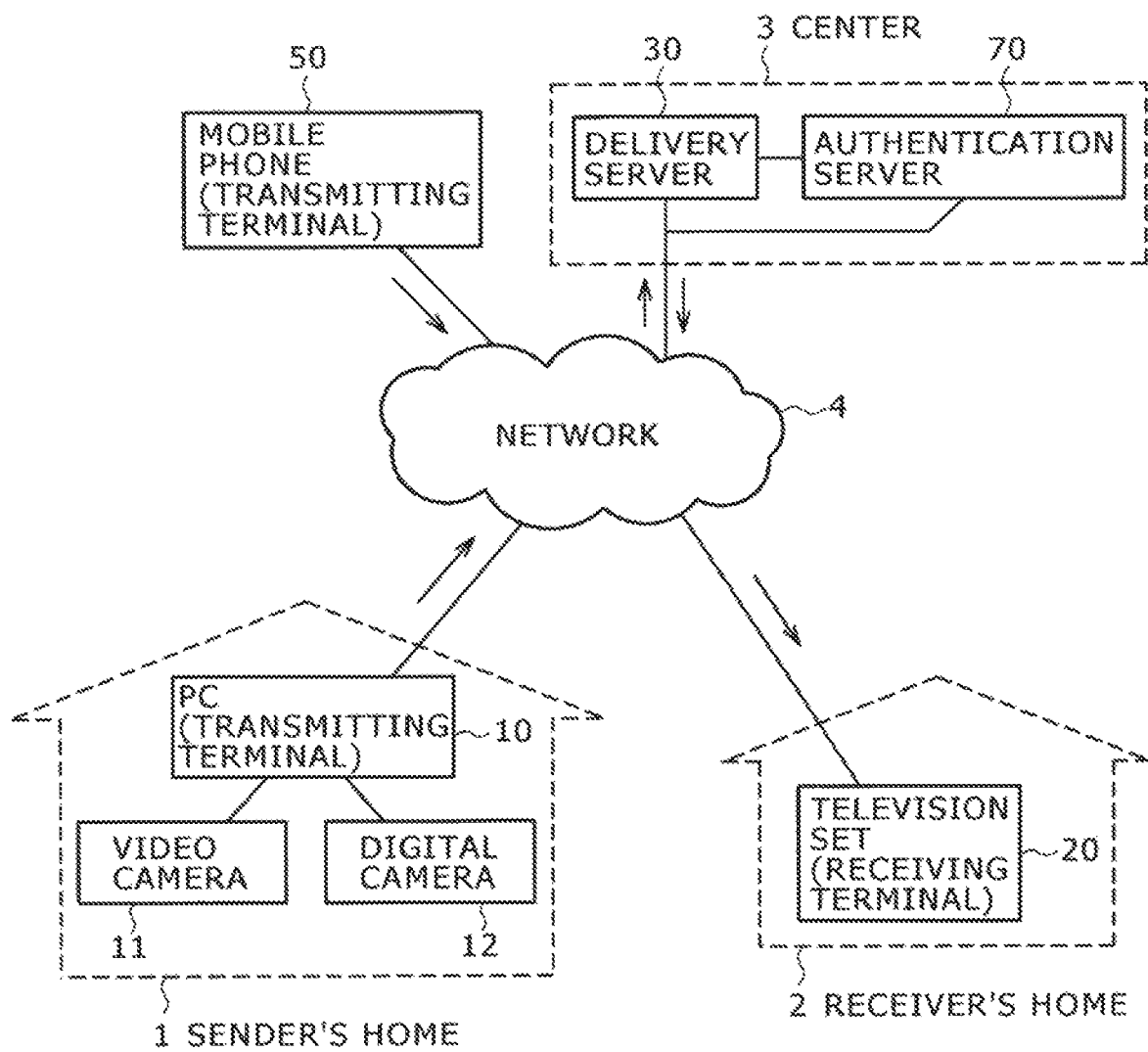
FIG. 34 is an overall architectural diagram showing an exemplary embodiment of a content delivery system.
Figures 35, 36:
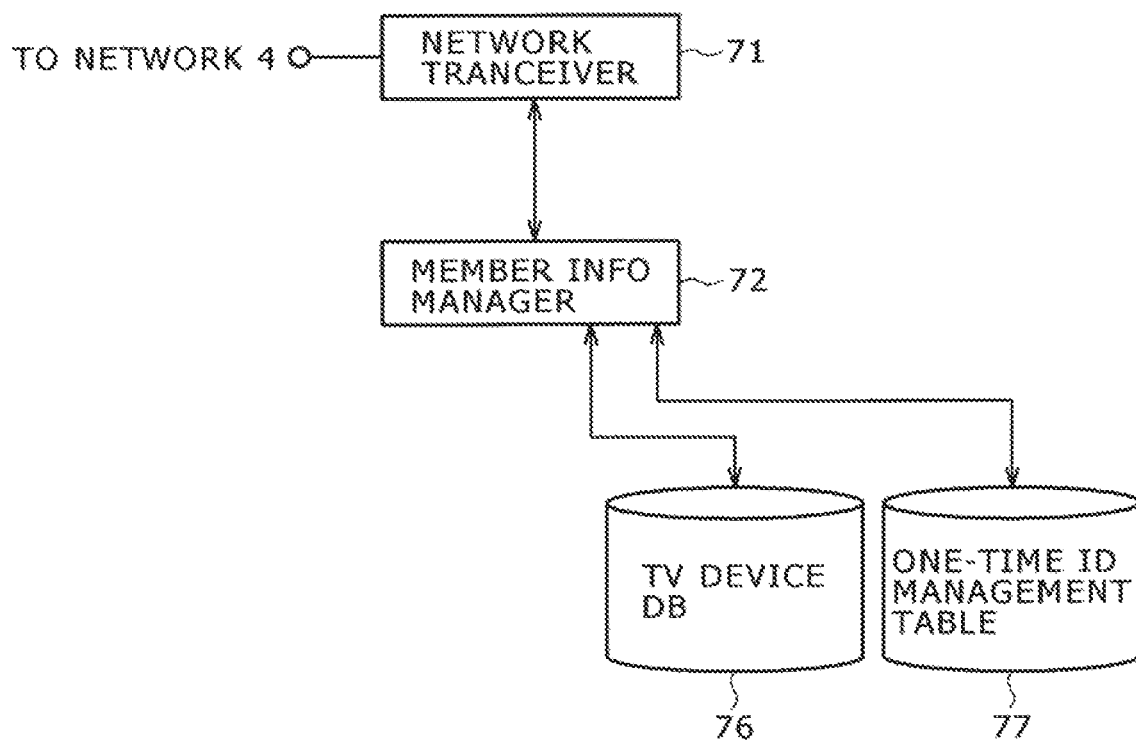
FIG. 35 is a diagram showing an exemplary internal structure of an authentication server 70.
FIG. 36 shows an example of TV device DB.
Figure 38:
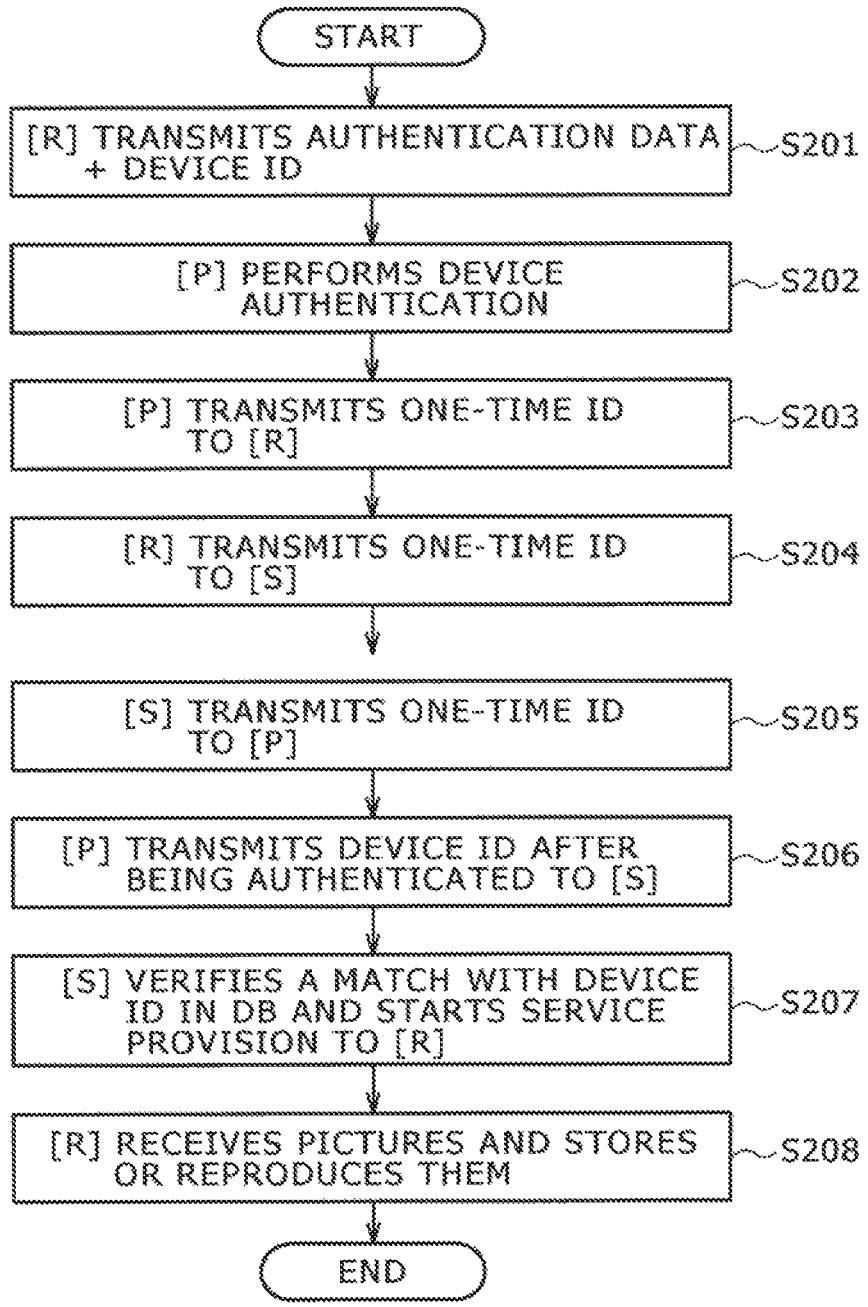
FIG. 38 is a flowchart illustrating a process flow of authentication.
Figure 41:
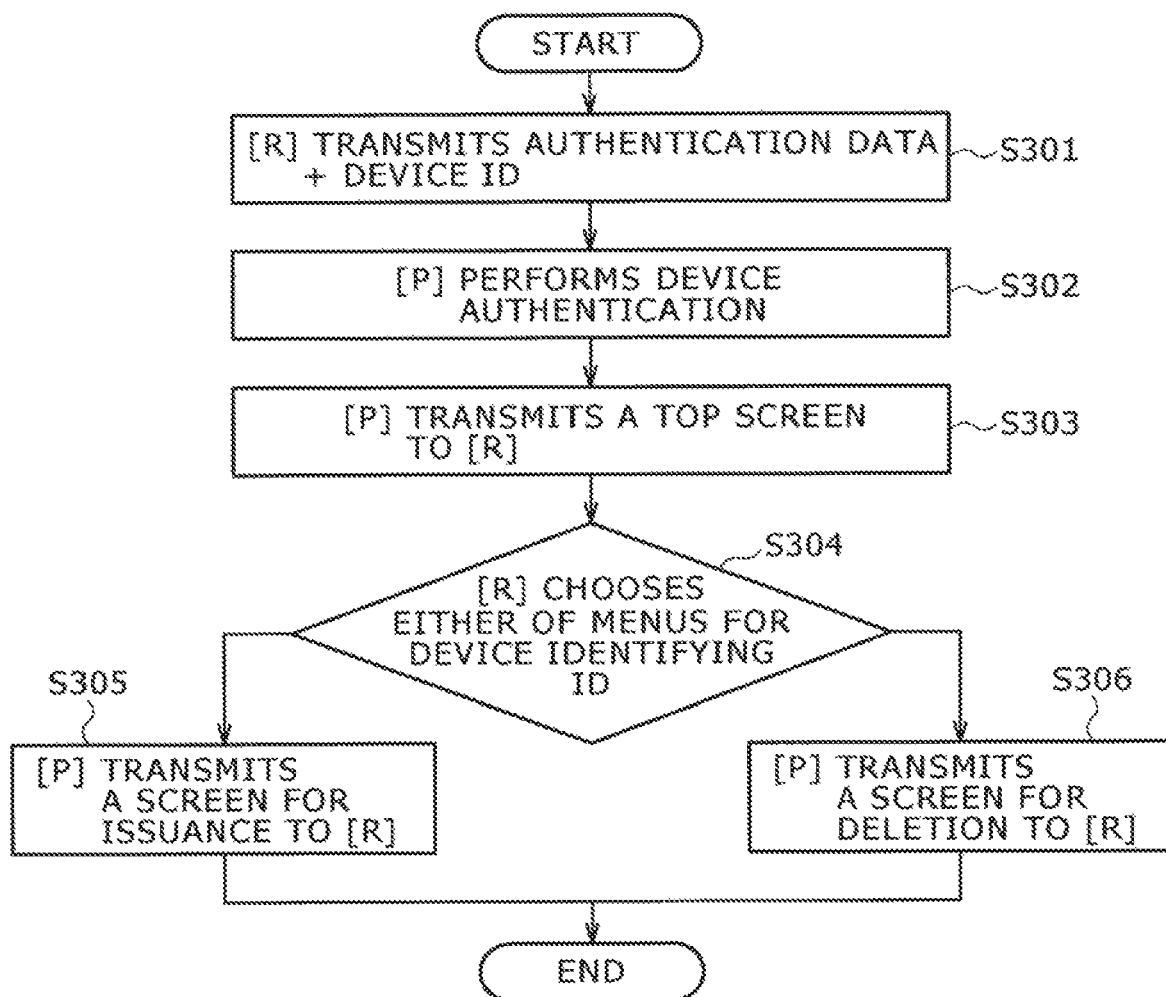
FIG. 41 is a flowchart illustrating a process flow regarding device identifying ID.
Figure 42:
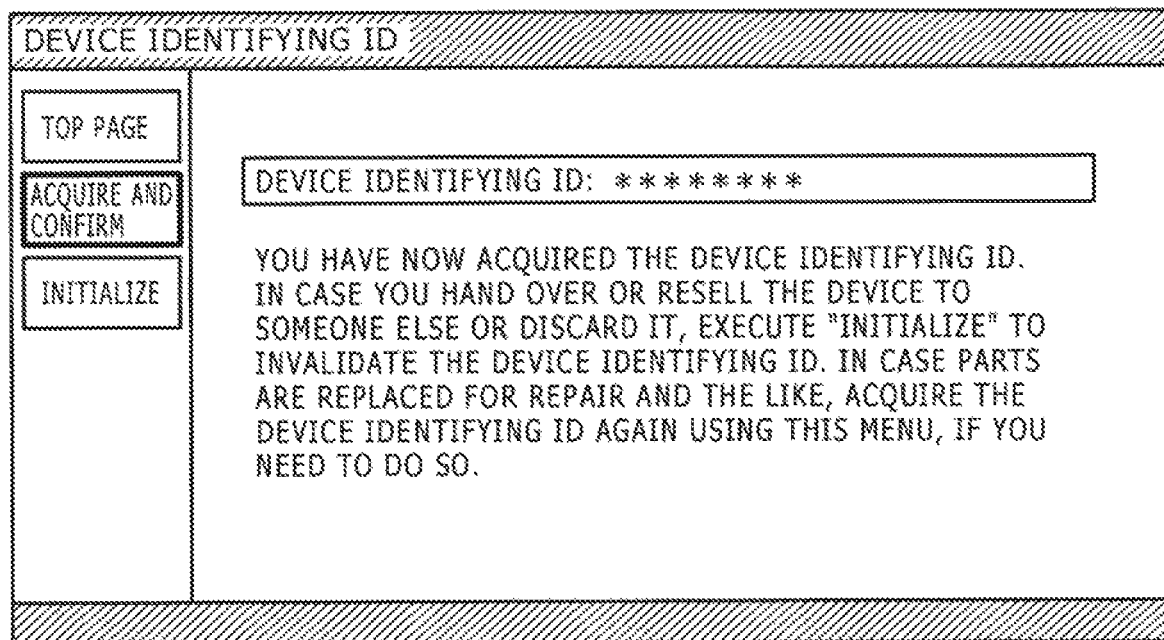
FIG. 42 shows an example of a screen to acquire and confirm a device identifying ID.
Figure 43:
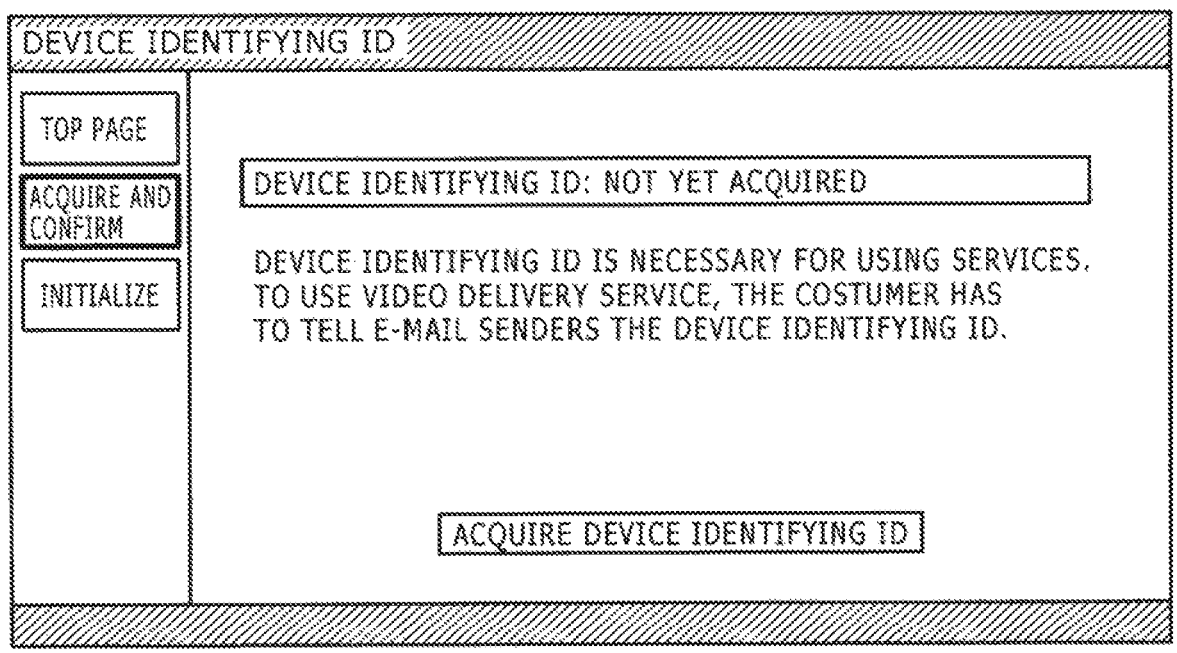
FIG. 43 shows an example of a screen to acquire and confirm a device identifying ID, when the user has no device identifying ID.
Figures 44, 45:
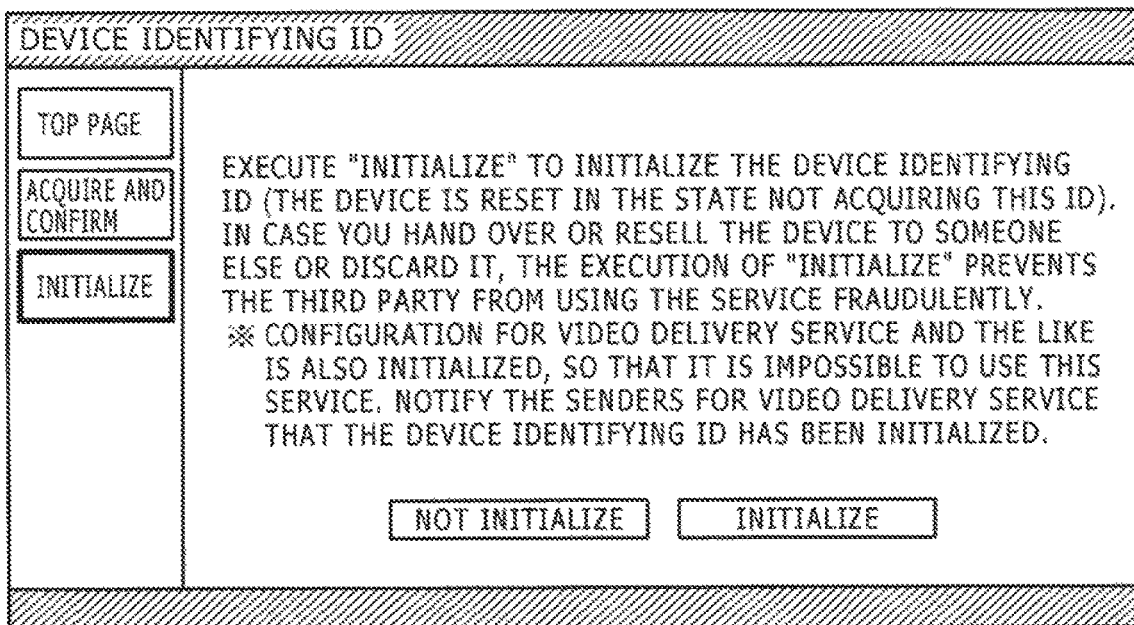
FIG. 44 shows an example of a screen to delete the device identifying ID.
FIG. 45 shows an example of an unread e-mail check table for management using device identifying ID.
Figure 49:
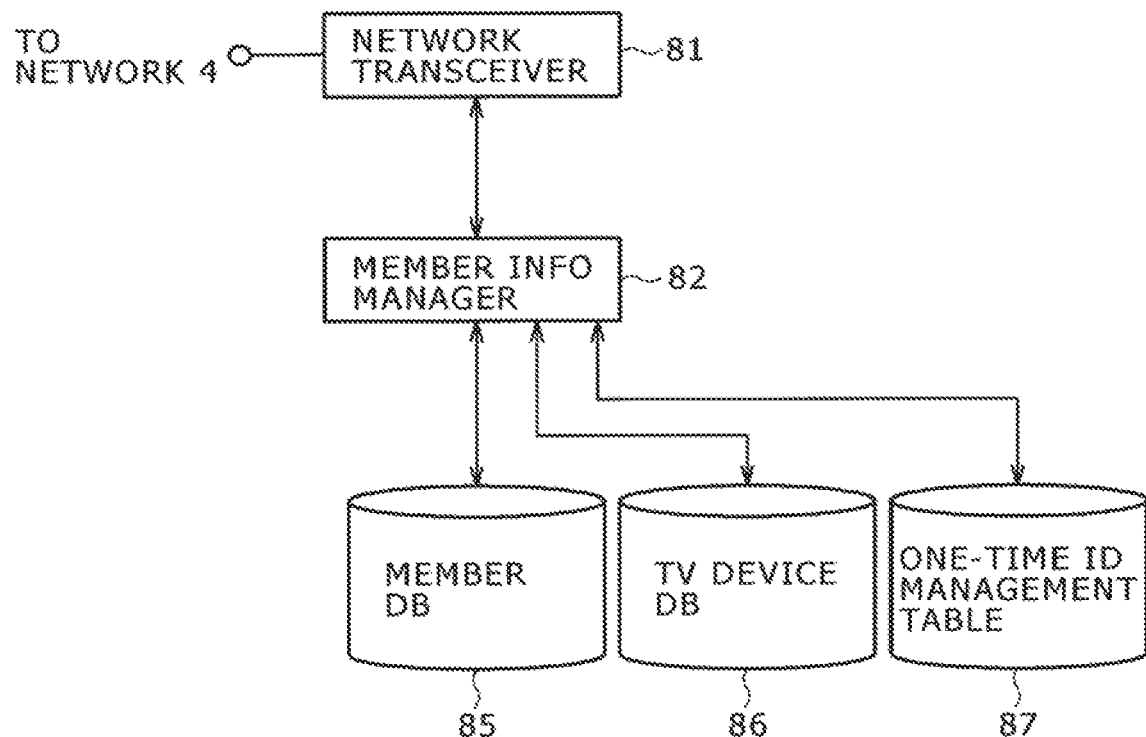
FIG. 49 is a diagram showing an exemplary internal structure of an authentication server 80.
Figure 53:
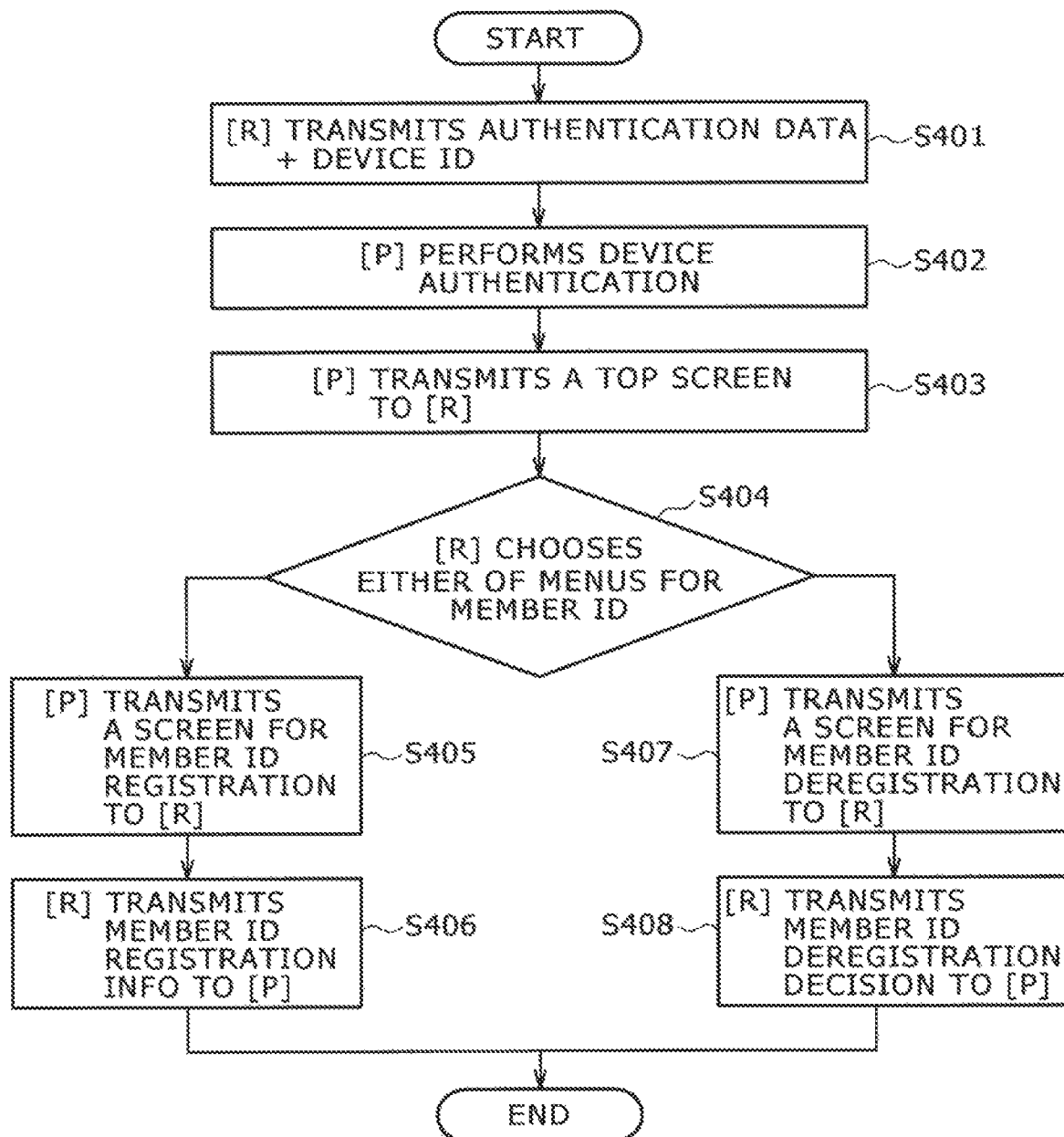
FIG. 53 is a flowchart illustrating a process flow regarding member ID.
Figure 58:
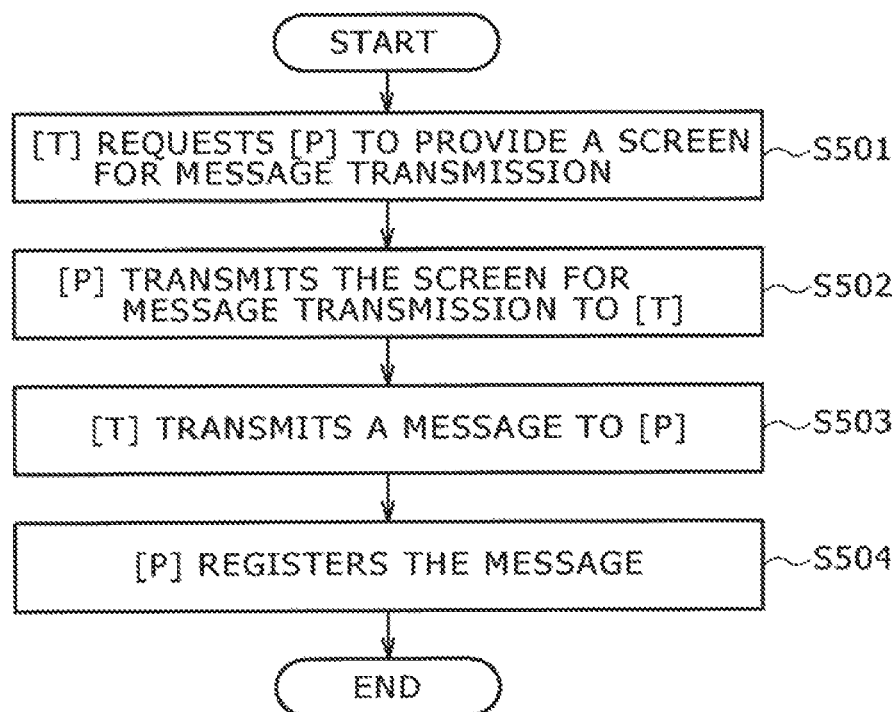
FIG. 58 is a flowchart illustrating a process flow to transmit a message by "memo messaging service".
Figure 62:
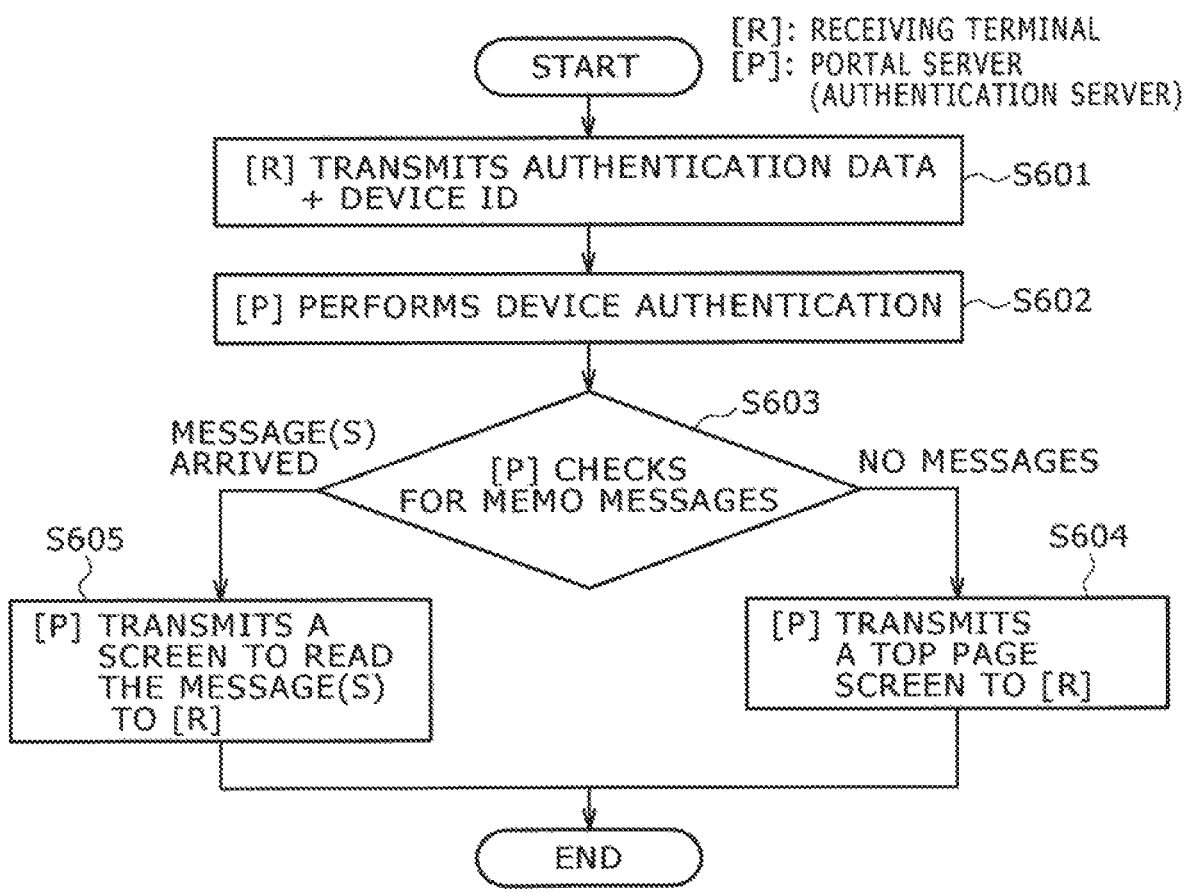
FIG. 62 is a flowchart illustrating a process flow to receive a message by "memo messaging service".
Figure 63:
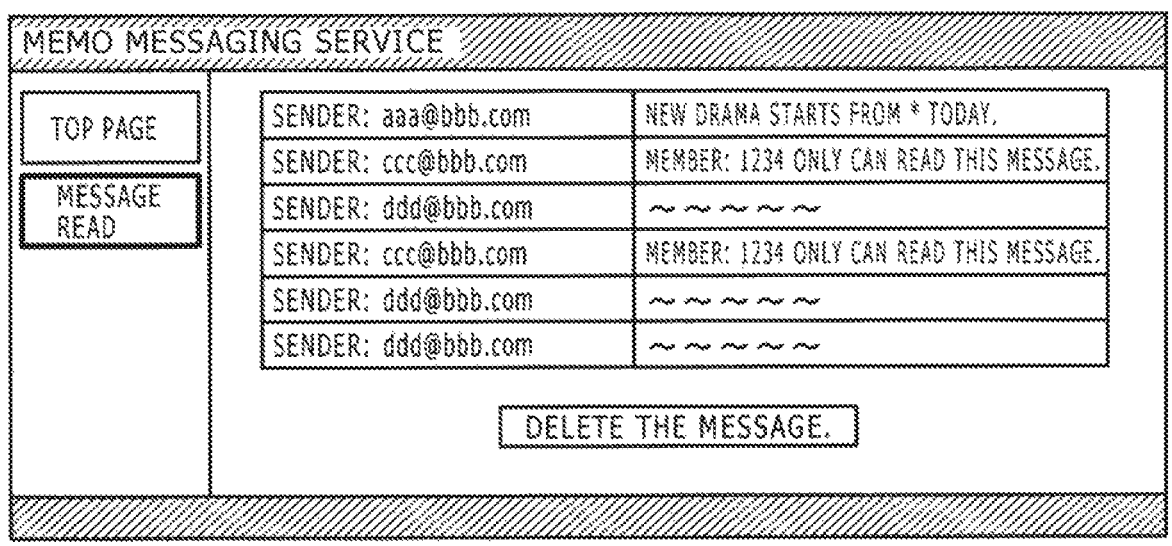
FIG. 63 shows an example of a "memo messaging" message list screen.
Figure 64:
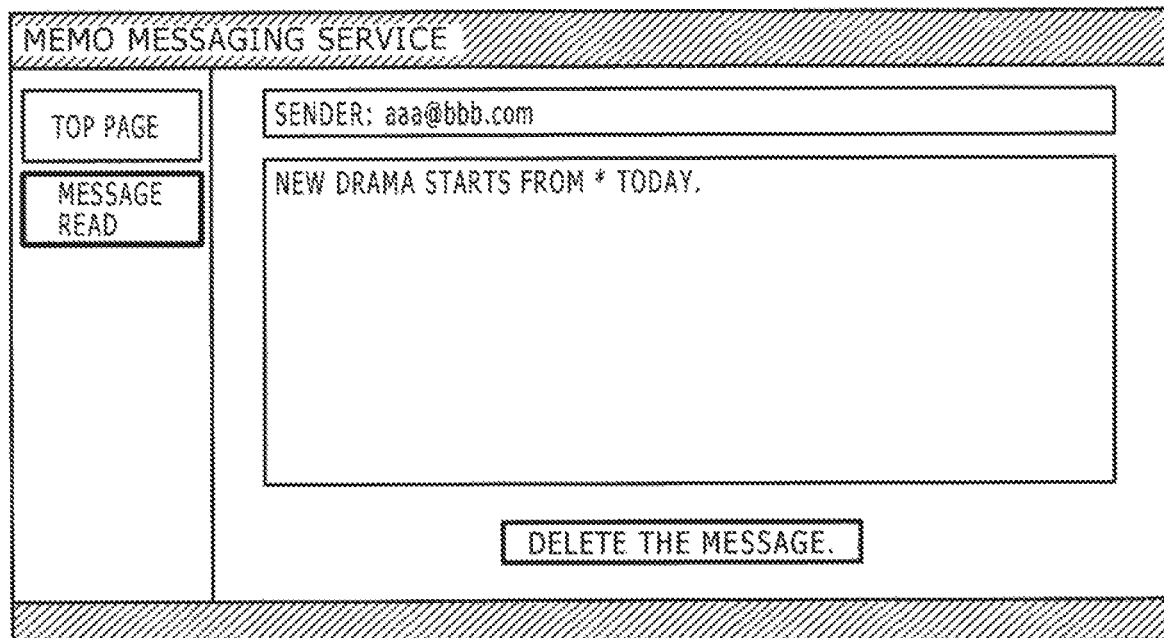
FIG. 64 shows an example of a "memo messaging" message display screen.
Figure 65:
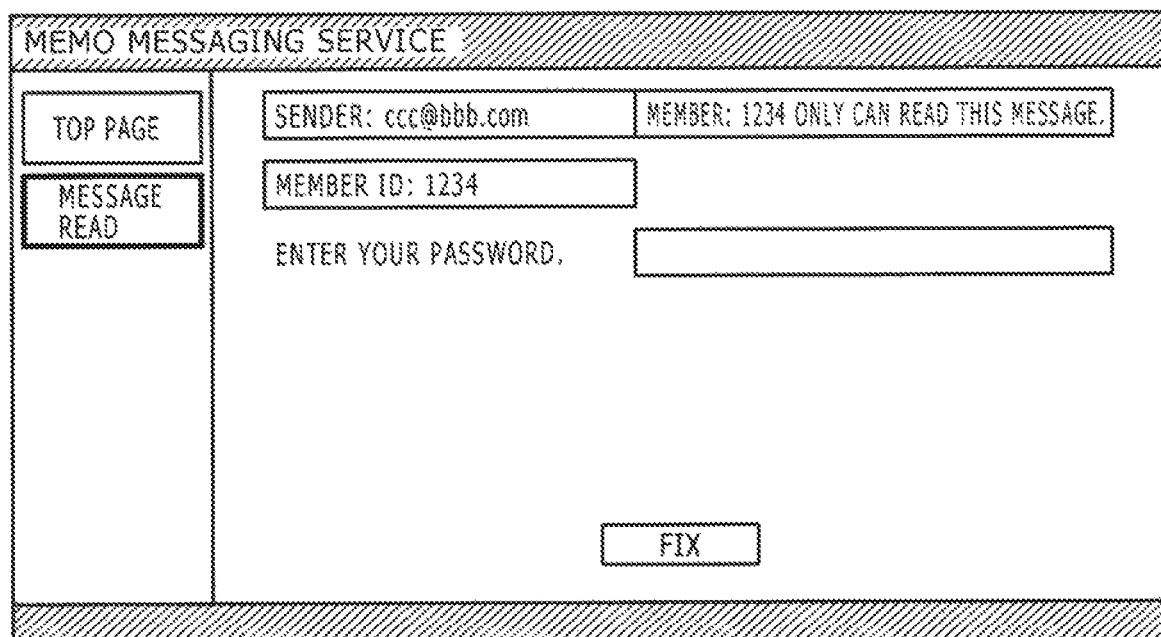
FIG. 65 shows an example of a screen to enter a password of a "memo messaging" member.

4 . . . Network
10 . . . Transmitting terminal (PC)
20 . . . Receiving terminal (TV set)
21 . . . Network transceiver
22 . . . Browser
23 . . . Picture reproducer
27 . . . Display
24 . . . Device ID sender
25 . . . Device ID storage
26 . . . Content storage
30 . . . Delivery server
31 . . . Network transceiver
32 . . . Member information manager
33 . . . Unread e-mail check table
34 . . . Sender DB
35 . . . Receiver DB
36 . . . TV device DB
37 . . . Content management table
38 . . . Content transceiver
39 . . . Content storage
50 . . . Mobile phone
70 . . . Authentication server
72 . . . Member information manager
76 . . . TV device DB
77 . . . One-time ID management table
80 . . . Authentication server
82 . . . Member information manager
85 . . . Member DB
86 . . . TV device DB
87 . . . One-time ID management table

The invention claimed is:

1. A content delivery system comprising a transmitting terminal, a
plurality of receiving terminals, and a delivery server,
wherein the delivery server comprises a database which registers a user ID of a sender who transmits a picture content and a user ID of each of a plurality of receivers who receives the picture content in association with each other, and a content storage which stores the picture content transmitted from the sender,
wherein, in a case that the transmitting terminal transmits a new picture content to the delivery server, each of the plurality of receiving terminals receives a first notice indicating that the new picture content is stored in the content storage, and
wherein each of the plurality of receiving terminals displays a list of the picture contents which are transmitted from the transmitting terminal and stored in the content storage, information about a sender who transmitted the listed picture contents, and a comment inputted by the transmitted terminal.

2. The content delivery system according to claim 1, wherein each of the plurality of receiving terminals further displays a group of the picture contents.

3. The content delivery system according to claim 1, wherein, in a case that each of the plurality of receiving terminals receives a second notice which indicates whether or not the delivery server registers the user ID of each of the plurality of receivers, each of the plurality of receiving terminals accepts an access to the delivery server via the second notice and the delivery server allows each of the plurality of receiving terminals to download the picture content transmitted from the transmitting terminal, and
in response to a downloading request from the registered user of each of the plurality of receivers, the delivery server transmits the picture content to each of the plurality of receiving terminals.

4. A content delivery system comprising a transmitting terminal and a plurality of receiving terminals,
wherein the transmitting terminal and the plurality of receiving terminals are coupled to a delivery server which comprises a database which registers a user ID of a sender who transmits a picture content and a user ID of each of a plurality of receivers who receives the picture content in association with each other, and a content storage which stores the picture content transmitted from the sender,
wherein, in a case that the transmitting terminal transmits a new picture content to the delivery server, each of the plurality of receiving terminals receives a first notice indicating that the new picture content is stored in the content storage, and
wherein each of the plurality of receiving terminals displays a list of the picture contents which are transmitted from the transmitting terminal and stored in the content storage, information about a sender who transmitted the listed picture contents, and a comment inputted by the transmitted terminal.

5. The content delivery system according to claim 4, wherein each of the plurality of receiving terminals further displays a group of the picture contents.

6. The content delivery system according to claim 4, wherein, in a case that each of the plurality of receiving terminals receives a second notice which indicates whether or not the delivery server registers the user ID of each of the plurality of receivers, each of the plurality of receiving terminals accepts an access to the delivery server via the second notice and the delivery server allows each of the plurality of receiving terminals to download the picture content transmitted from the transmitting terminal, and in response to a downloading request from the registered user of each of the plurality of receivers, the delivery server transmits the picture content to each of the plurality of receiving terminals.

7. A method for delivering picture contents among a transmitting terminal, a plurality of receiving terminals and a delivery server which comprises a database which registers a user ID of a sender who transmits a picture content and a user ID of each of a plurality of receivers who receives the picture content in association with each other, and a content storage which stores the picture content transmitted from the sender, the method comprising the steps of:

transmitting a first notice indicating that a new picture content is stored in the content storage from the transmitting terminal to each of the plurality of receiving terminals in a case that the transmitting terminal transmits the new picture content to the delivery server; and displaying, by each of the plurality of receiving terminals, a list of the picture contents which are transmitted from the transmitting terminal and stored in the content storage, information about a sender who transmitted the listed picture contents, and a comment inputted by the transmitting terminal.

8. The method for delivering picture contents according to claim 7, further comprising the step of:

displaying, by each of the plurality of receiving terminals, a group of the picture contents.

9. The method for delivering picture contents according to claim 7, further comprising the steps of:

in a case that each of the plurality of receiving terminals receives a second notice which indicates whether or not the delivery server registers the user ID of each of the plurality of receivers and each of the plurality of receiving terminals accepts an access to the delivery server via the second notice, allowing, by the delivery server, each of the plurality of receiving terminals to download the picture content transmitted from the transmitting terminal, and in response to a downloading request from the registered user of each of the plurality of receivers, transmitting the picture content from the delivery server to each of the plurality of receiving terminals.

* * * * *